（12） United States Patent
Onggosanusi et al.

(10) Patent No.: US 10,411,868 B2
(45) Date of Patent: Sep. 10, 2019

(54) METHOD AND APPARATUS FOR CHANNEL STATE INFORMATION (CSI) REPORTING

(71) Applicant: Samsung Electronics Co., Ltd, Suwon-si (KR)

(72) Inventors: Eko Onggosanusi, Mountain View, CA (US); Md. Saifur Rahman, Mountain View, CA (US); Hoondong Noh, Mountain View, CA (US); Youngwoo Kwak, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 15/437,363

(22) Filed: Feb. 20, 2017

(65) Prior Publication Data

US 2017/0244533 A1    Aug. 24, 2017

Related U.S. Application Data

(60) Provisional application No. 62/339,455, filed on May 20, 2016, provisional application No. 62/319,636, (Continued)

(51) Int. Cl.
*H04L 5/00* (2006.01)
*H04B 7/0456* (2017.01)
*H04B 7/06* (2006.01)

(52) U.S. Cl.
CPC ......... *H04L 5/0057* (2013.01); *H04B 7/0478* (2013.01); *H04B 7/0469* (2013.01); *H04B 7/0486* (2013.01); *H04B 7/0689* (2013.01)

(58) Field of Classification Search
CPC .... H04B 7/024; H04B 7/0626; H04B 7/0636; H04B 7/005; H04B 7/0478
See application file for complete search history.

(56) References Cited

U.S. PATENT DOCUMENTS

2010/0023845 A1*   1/2010   Cheng ................. H03M 13/095
                                                      714/790
2014/0044083 A1*   2/2014   Kim ....................... H04L 5/001
                                                      370/329
(Continued)

FOREIGN PATENT DOCUMENTS

EP        2566085 A1      3/2013
WO    WO-2012094608 A2 *  7/2012  ............. H04B 7/024
(Continued)

OTHER PUBLICATIONS

ISA/KR, "International Search Report," International Application No. PCT/KR2017/002089, dated May 30, 2017, Korean Intellectual Property Office, Korea, 3 pages.
(Continued)

*Primary Examiner* — Un C Cho
*Assistant Examiner* — Peter K Mak

(57) ABSTRACT

Methods and apparatuses for CSI reporting mechanisms are provided. A user equipment (UE) includes a transceiver and a processor operably connected to the transceiver. The transceiver is configured to receive configuration information including a channel state information (CSI) process, a first multiple-input multiple-output (MIMO) Type, and a second MIMO Type. The processor is configured to calculate and report, in response to receipt of the configuration information, a CSI for each of the first and second MIMO Types. The second MIMO Type is Class B and is associated with a single non-zero-power CSI reference signal (NZP CSI-RS) resource that includes at most 8 antenna ports.

17 Claims, 12 Drawing Sheets

Related U.S. Application Data filed on Apr. 7, 2016, provisional application No. 62/316,244, filed on Mar. 31, 2016, provisional application No. 62/315,366, filed on Mar. 30, 2016, provisional application No. 62/309,760, filed on Mar. 17, 2016, provisional application No. 62/304,631, filed on Mar. 7, 2016, provisional application No. 62/299,227, filed on Feb. 24, 2016.

(56) References Cited

U.S. PATENT DOCUMENTS

| | | | |
|---|---|---|---|
| 2015/0071272 A1* | 3/2015 | Vermani | H04B 7/0452 370/338 |
| 2016/0013855 A1* | 1/2016 | Campos | H04B 7/12 370/343 |
| 2016/0164594 A1* | 6/2016 | Shapira | H04B 7/0617 375/267 |
| 2018/0115357 A1* | 4/2018 | Park | H04B 7/04 |

FOREIGN PATENT DOCUMENTS

| | | |
|---|---|---|
| WO | 2015093910 A1 | 6/2015 |
| WO | 2015190847 A1 | 12/2015 |
| WO | 2016175623 A1 | 11/2016 |
| WO | 2016195335 A1 | 12/2016 |
| WO | 2017082634 A1 | 5/2017 |

OTHER PUBLICATIONS

Samsung, "Handling collision between nonPrecoded type and beamformed type CSI Reports", R1-160354, 3GPP TSG RAN WG1 Meeting #84, St. Julians's, Malta, Feb. 15-19, 2016, 3 pages.

ZTE, "Codebook Design for Rank 5-8", R1-160850, 3GPP TSG RAN WG1 Meeting #84, St. Julian's, Malta, Feb. 15-18, 2016, 43 pages.

Samsung, "Draft CR on CSI-RS for class A CSI reporting", R1-160523, 3GPP TSG RAN WG1 Meeting #84, St. Julian's, Malta, Feb. 15-19, 2016, 3 pages.

3GPP TS 36.211 V12.4.0 (Dec. 2014) Technical Specification 3rd Generation Partnership Project; Technical Specification Group Radio Access Network; Evolved Universal Terrestrial Radio Access (E-UTRA); Physical channels and modulation (Release 12) 124 pages.

3GPP TS 36.212 V12.3.0 (Dec. 2014) Technical Specification 3rd Generation Partnership Project; Technical Specification Group Radio Access Network; Evolved Universal Terrestrial Radio Access (E-UTRA); Multiplexing and channel coding (Release 12) 89 pages.

3GPP TS 36.213 V12.4.0 (Dec. 2014) Technical Specification 3rd Generation Partnership Project; Technical Specification Group Radio Access Network; Evolved Universal Terrestrial Radio Access (E-UTRA); Physical layer procedures (Release 12) 225 pages.

3GPP TS 36.321 V12.4.0 (Dec. 2014) Technical Specification 3rd Generation Partnership Project; Technical Specification Group Radio Access Network; Evolved Universal Terrestrial Radio Access (E-UTRA); Medium Access Control (MAC) protocol specification (Release 12) 60 pages.

3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12) 410 pages.

Extended European Search Report regarding Application No. 17756870.6, dated Feb. 11, 2019, 13 pages.

Samsung, "Draft CR on mismatched FD-MIMO configuration fields between 36.213 and 36.331", 3GPP TSG RAN WG1 Meeting #84, R1-160522, Feb. 2016, 59 pages.

ETRI, "CSI types and reporting modes", 3GPP TSG RAN WG1 Meeting #83, R1-157107, Nov. 2015, 4 pages.

* cited by examiner

METHOD AND APPARATUS FOR CHANNEL STATE INFORMATION (CSI) REPORTING

CROSS-REFERENCE TO RELATED APPLICATIONS AND CLAIM OF PRIORITY

This application claims priority under 35 U.S.C. § 119(e) to:
U.S. Provisional Patent Application Ser. No. 62/299,227 filed Feb. 24, 2016;
U.S. Provisional Patent Application Ser. No. 62/304,631 filed Mar. 7, 2016;
U.S. Provisional Patent Application Ser. No. 62/309,760 filed Mar. 17, 2016;
U.S. Provisional Patent Application Ser. No. 62/315,366 filed Mar. 30, 2016;
U.S. Provisional Patent Application Ser. No. 62/316,244 filed Mar. 31, 2016;
U.S. Provisional Patent Application Ser. No. 62/319,636 filed Apr. 7, 2016; and
U.S. Provisional Patent Application Ser. No. 62/339,455 filed May 20, 2016.
The above-identified provisional patent applications are hereby incorporated by reference in their entirety.

TECHNICAL FIELD

The present disclosure relates generally to transmission method and channel state information (CSI) reporting for multiple transmit antennas which includes two dimensional arrays. Such two dimensional arrays can be associated, for example, with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive configuration information including a channel state information (CSI) process, a first multiple-input multiple-output (MIMO) Type, and a second MIMO Type. The processor is configured to calculate and report, in response to receipt of the configuration information, a CSI for each of the first and second MIMO Types. The second MIMO Type is Class B and is associated with a single non-zero-power CSI reference signal (NZP CSI-RS) resource that includes at most 8 antenna ports.

In another embodiment, a base station (BS) is provided. The BS includes a processor and a transceiver operably connected to the processor. The processor is configured to generate, for a UE, configuration information including a CSI process, a first MIMO Type, and a second MIMO Type; and generate, for the UE, a NZP CSI-RS setting and a CSI-RS associated with the NZP CSI-RS setting, the NZP CSI-RS setting and associated CSI-RS corresponding to each of the first and second MIMO Types. The transceiver is configured to transmit, to the UE, the configuration information and the CSI-RS corresponding to each of the first and second MIMO Types; and receive, from the UE, a CSI report corresponding to each of the first and second MIMO Types on an uplink channel. The second MIMO Type is Class B and is associated with a single non-zero-power CSI NZP CSI-RS resource that includes at most 8 antenna ports.

In another embodiment, a method for operating a UE is provided. The method includes receiving, by the UE, configuration information including a CSI process, a first MIMO Type, and a second MIMO Type; and in response to receipt of the configuration information, calculating and reporting, by the UE, a CSI for each of the first and second MIMO Types. The second MIMO Type is Class B and is associated with a single non-NZP CSI-RS resource that includes at most 8 antenna ports.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
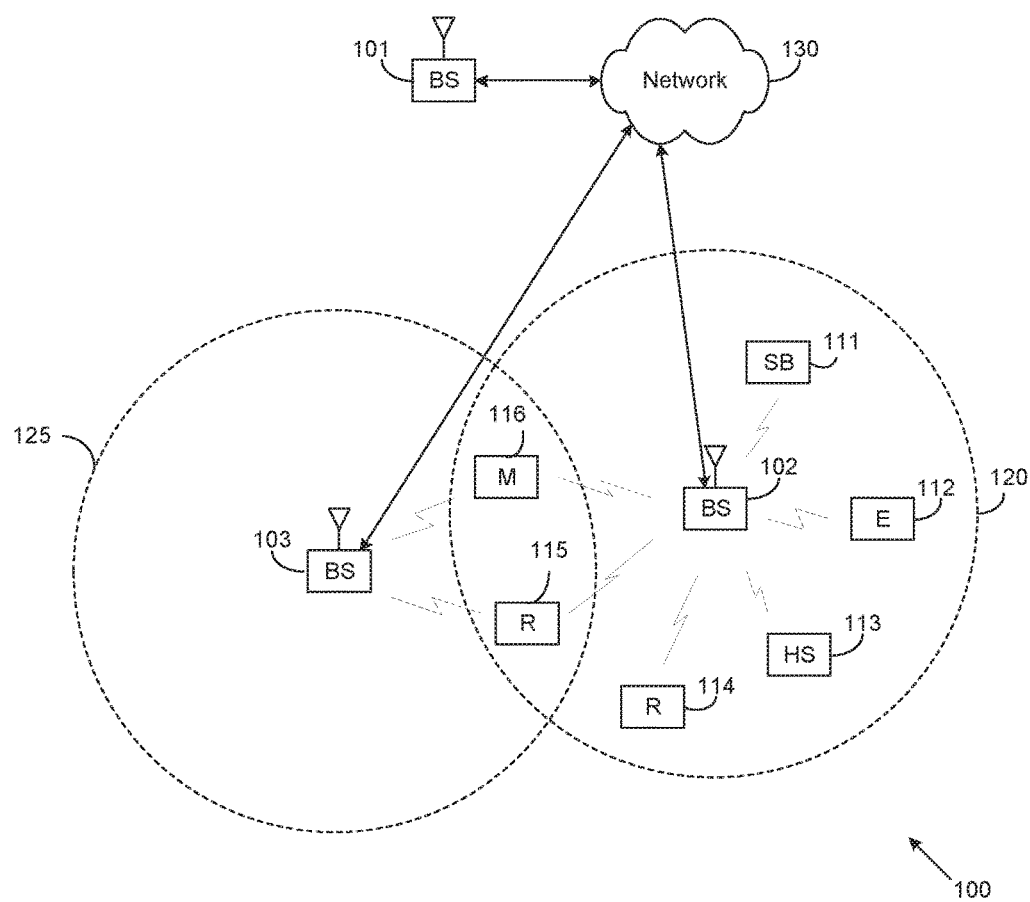
FIG. 1 illustrates an example wireless network according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)

DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Instead of "eNB", an alternative term "gNB" (general Node B) can also be used. Depending on the network type, other well-known terms can be used instead of "eNB" or "BS," such as "base station" or "access point." For the sake of convenience, the terms "eNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of eNB 101, eNB 102, and eNB 103 transmit to UEs 111-116 with precoder cycling and configure UEs 111-116 for CSI reporting as described in embodiments of the present disclosure. In various embodiments, one or more of UEs 111-116 perform calculation and reporting for of CSI.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
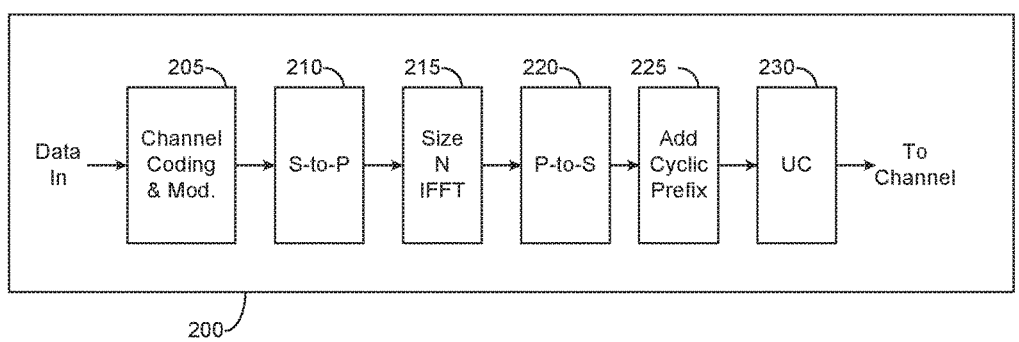
FIGS. 2A and 2B illustrate example wireless transmit and receive paths according to various embodiments of the present disclosure.
Figure 2B:
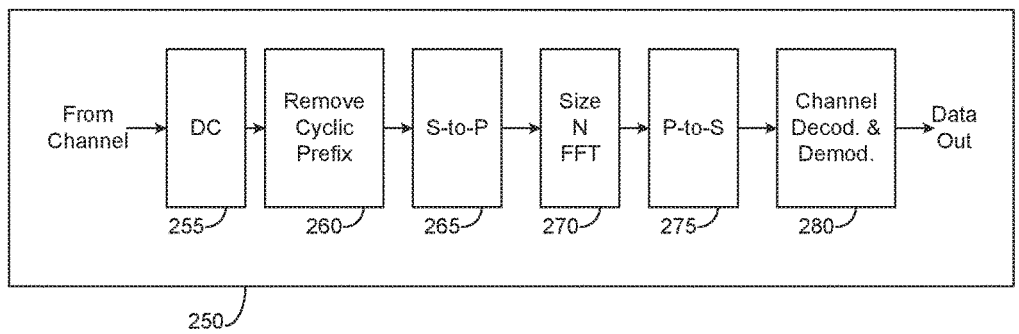

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
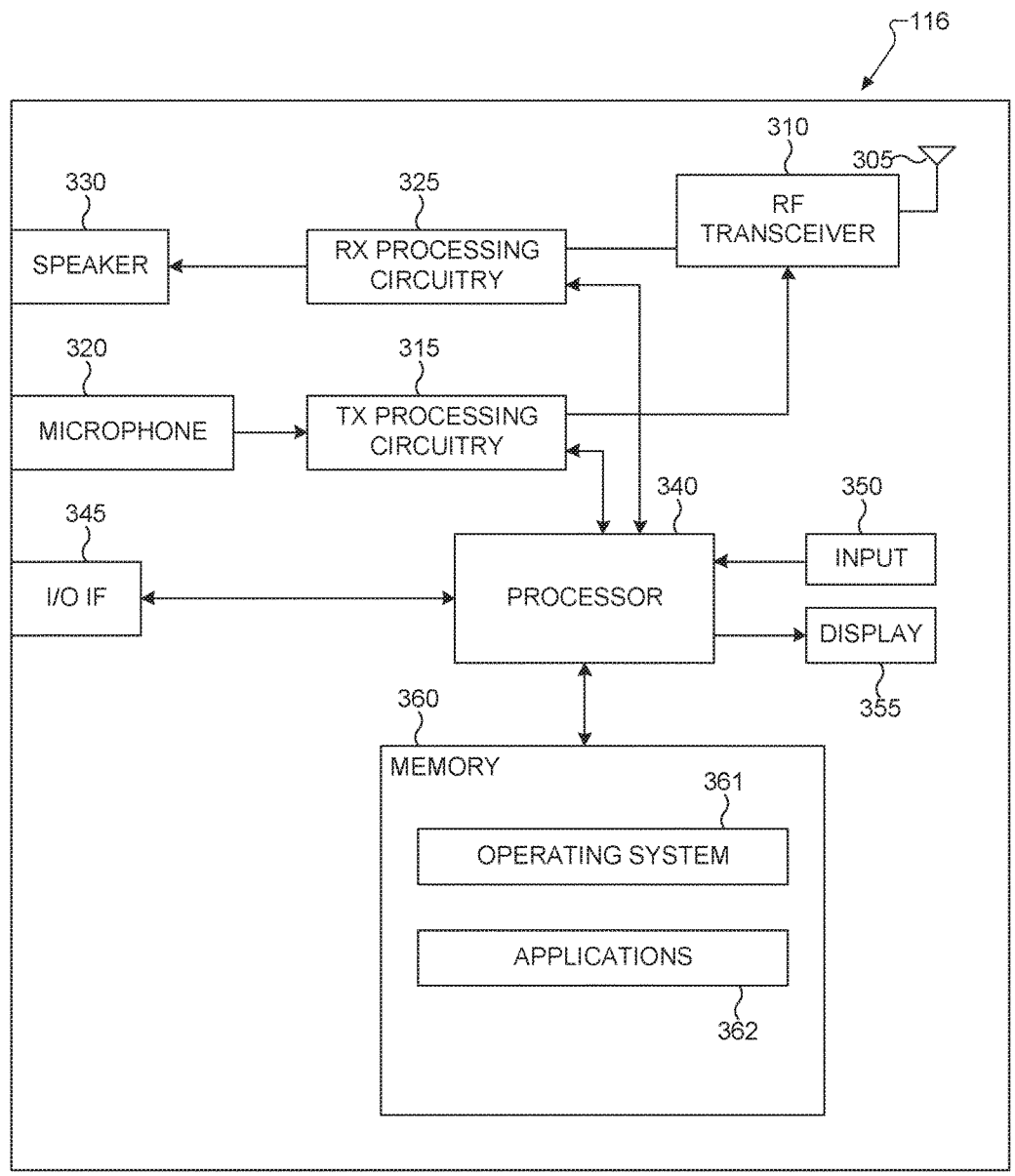
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
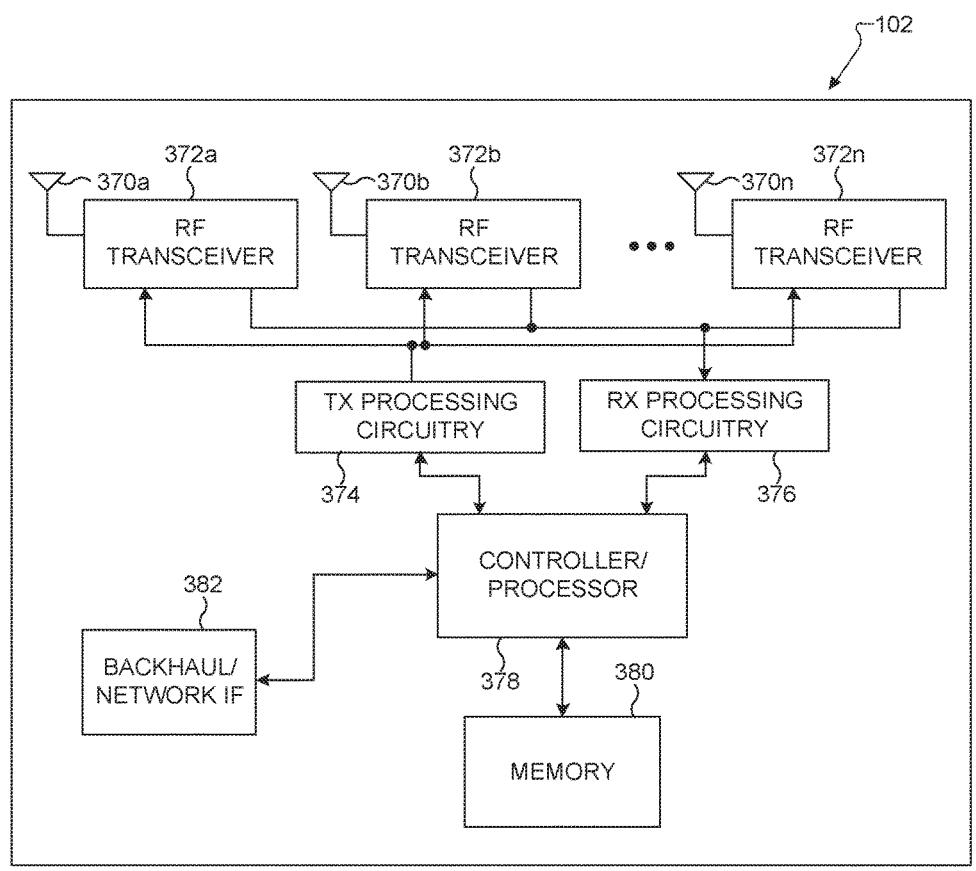
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
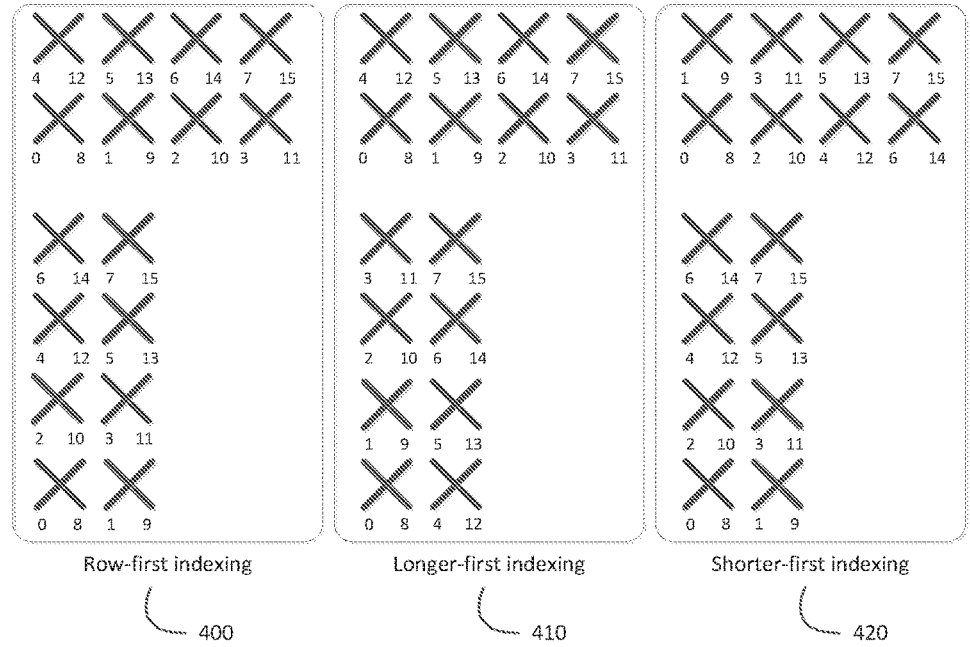
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 illustrates example two-dimensional (2D) antenna arrays constructed from 16 dual-polarized elements arranged in a 4×2 or 2×4 rectangular format which can be utilized in various embodiments of the present disclosure. In this illustrative embodiment, the 2D dual-polarized antenna port array includes $M_a$ rows and $N_a$ columns where $(M_a, N_a)=(2,4)$ and $(4,2)$. The embodiment of the 2D dual-polarized antenna port array shown in FIG. 4 is for illustration only. Other embodiments of the 2D dual-polarized antenna port array could be used without departing from the scope of the present disclosure.

The example 2D dual-polarized antenna port array arrangement results in a total of $2M_aN_a=16$ ports, each mapped to one CSI-RS port. The three indices 400, 410, and 420 are three examples in indexing the 16 antenna ports as a means of mapping antenna ports to precoding matrix elements. For row-first indexing 400, antenna ports associated with the same polarization group are indexed in a row-first manner regardless of $(M_a, N_a)$. For longer-first indexing 410, antenna ports associated with the same polarization group are indexed in a column-first manner when $M_a > N_a$, but row-first manner when $M_a \leq N_a$. For shorter-first indexing 420, antenna ports associated with the same polarization group are indexed in a row-first manner when $M_a > N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for the "set S subbands") or subband (one CSI parameter calculated for each "set S subband") reporting is performed. The supported CSI reporting modes are given in TABLE 1 and 2.

TABLE 1

CQI and PMI Feedback Types for PUSCH (Aperiodic) CSI Reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | | Mode 2-0 | Mode 2-2 |
| | Higher Layer-configured (subband CQI) | Mode 3-0 | Mode 3-1 | Mode 3-2 |

TABLE 2

CQI and PMI Feedback Types for PUCCH (Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Rel.12 LTE, dual-stage precoding codebook enumerated with a first and a second PMI values ($i_1$ and $i_2$, respectively) are supported for 4 and 8 antenna ports. The first PMI value $i_1$ is associated with a group of four DFT beams/precoders. The second PMI value $i_2$, on the other hand, selects one out of four beams/precoders indicated with $i_1$, along with QPSK co-phasing between two polarization groups.

In Rel.13 LTE, a flexible codebook structure which accommodates 2D CSI-RS port patterns is supported for 'CLASS A' eMIMO-Type with 8, 12, and 16 antenna ports, where not only $(N_1, N_2)$ are configurable, but also oversampling factors for both dimensions $(O_1, O_2)$ and four types of codebook subset selections configured via RRC parameter codebook-Config. In addition, a single-stage beam selection codebook for 2, 4, or 8 antenna ports is also supported for 'CLASS B' eMIMO-Type.

Based on the above codebook, a resulting precoding matrix can be described in Equation 1. That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components $i_{1,1}$, $i_{1,2}$, $i_2$. The first stage pertains to a long-term component. Therefore, the first stage is associated with long-term channel statistics such as angle-of-departure (AoD) profile and AoD spread. On the other hand, the second stage pertains to a short-term component which performs selection, co-phasing, or any linear operation to the first component precoder $W_{1,1}(i_{1,1}) \otimes W_{1,2}(i_{i,2})$. In the present disclosure, $A \otimes B$ denotes the Kronecker product between two matrices A and B. The precoder $W_2(i_2)$, therefore, performs a linear transformation of the long-term component such as a linear combination of a set of basis functions or vectors associated with the column vectors of $W_{1,1}(i_{1,1}) \otimes W_{1,2}(i_{1,2}))$.

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \quad \text{(Equation 1)}$$

Here, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

The above precoding description is especially suitable when the serving eNB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include (assuming the partial KP design inherent in the Rel.13 codebook described above) a three-component PMI $\{i_{1,1}, i_{1,2}, i_2\}$.

Another type of CSI-RS applicable to FD-MIMO is beamformed CSI-RS (BF CSI-RS). For example, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNB, the UE can be configured to report PMI parameters associated with $W_2$ ($W_{2,1}$ and/or $W_{2,2}$) without $W_1$ ($W_{1,1}$ and/or $W_{1,2}$) or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices $W(i_{1,1}, i_{1,2}, i_2)$), a UE measures a CSI-RS in a subframe designated to carry CSI-RS, calculates/determines a CSI (including PMI, RI, and CQI where each of these three CSI parameters can include multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is used for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

Efficient allocation of CSI-RS resources not only increases throughput for the desired cell, but also reduces inter-cell interference. To harness their full potential, CSI-RS resource allocation schemes such as hybrid CSI-RS can be used together with a supporting CSI calculation and reporting schemes.

Therefore, there is a need to introduce a CSI calculation and reporting procedure specifically designed when a UE is configured with two eMIMO-Types or CSI-RS types, including but not limited to hybrid CSI-RS.

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially these two CSI-RS types are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are examples and can be substituted with other labels such as '1' and '2', or 'A' and 'B', or TYPE1 and TYPE2, or CLASS-A and CLASS-B. In another example, a MIMO type or eMIMO-Type which can be associated with CSI reporting operation can be used to differentiate those two modes of operation instead of CSI-RS type. For example, a UE is configured with a MIMO type or eMIMO-Type associated with CSI reporting behaviors and, in addition, CSI measurement behaviors. Names of higher-layer or RRC parameters utilized in this invention disclosure are example and illustrative. Other names which serve same functionalities can be utilized.

Throughout this invention, 1D or 2D dual-polarized array is used solely for illustrative purposes, unless stated otherwise. Extensions to 1D or 2D single-polarized array are straightforward for those skilled in the art.

For the above purposes, the present disclosure includes CSI reporting schemes when a UE is configured with two eMIMO-Type settings where each setting is configured with at least one CSI-RS resource (or CSI-RS resource configuration), where different CSI-RS resources (or resource configurations) can be assigned different number of ports. It also includes configurations and signaling to support the disclosed CSI reporting schemes.

For the above purposes, the present disclosure includes at least two components. The first component pertains to CSI reporting schemes. The second component pertains to codebook used for CSI reporting.

The first component of the present disclosure includes six embodiments. The embodiments in the present disclosure are described assuming that a UE is configured with two eMIMO-Type settings where each setting can be associated with one or a plurality of CSI-RS resources (or CSI-RS resource configurations). Each eMIMO-Type is signaled to the UE via higher-layer (RRC) signaling. Examples of eMIMO-Type, as previously described, are 'CLASS A' ('nonPrecoded'), 'CLASS B' ('beamformed') with one or more than one CSI-RS resources (or CSI-RS resource configurations), or a new type such as 'CLASS B-2' or 'CLASS C'. In subsequent descriptions, CQI and PMI components ($i_1$, $i_{1,1}$, $i_{1,2}$ and/or $i_2$) are calculated conditioned on the last reported RI or the RI reported together with CQI and/or PMI. In some UE implementations, the CSI parameters can be calculated interdependently or jointly. That is, RI is chosen conditioned on hypothetical values of CQI and/or PMI. In this manner, a CSI parameter is calculated conditioned on the other CSI parameters.

In a first embodiment, a first CSI-RS resource (or CSI-RS resource configuration) is associated with eMIMO-Type of 'CLASS A' ('nonPrecoded') and a second CSI-RS resource (or CSI-RS resource configuration) is associated with eMIMO-Type of 'CLASS B' ('beamformed'). In this case, 'CLASS B' ('beamformed') is associated with one CSI-RS resource. The number of CSI-RS ports for the first 'CLASS A' CSI-RS resource $P_1$ can be different from that for the second 'CLASS B' CSI-RS resources $P_2$ where $P_1 \geq P_2$. At least two sub-embodiments of this embodiment are possible for periodic CSI (P-CSI) reporting.

For the schemes described in this embodiment, PMI $i_1$ denotes the PMI associated with the first index of a 'CLASS A' ('nonPrecoded') codebook. Depending on the codebook configuration, this first index $i_1$ can include one component or two components $\{1,1, i_{1,2}\}$. The other PMI $i_2$ can denote either the index of a codebook different from the 'CLASS A' ('nonPrecoded') codebook or the second index of a 'CLASS A' ('nonPrecoded') codebook.

When the first index $i_1$ can include one component or two components $\{i_{1,1}, i_{1,2}\}$, an alternative embodiment is possible where the first CSI-RS resource includes two components, for the two dimensions, one to calculate $i_{1,1}$ and the other to calculate $i_{1,2}$. They can be reported jointly or separately. In this case, one joint two-PMI codebook or two separate one-PMI codebook can be used for PMI calculation.

A first sub-embodiment is to associate both a first CSI-RS resource (or CSI-RS resource configuration) and a second CSI-RS resource (or CSI-RS resource configuration) with a single CSI process. Therefore, CSI reports and calculations associated with the two CSI-RS resources (or CSI-RS resource configurations) can be either dependent on or independent of each other—that is, the two CSI reports are associated with one CSI reporting configuration. In the present disclosure, four example schemes (schemes 1, 2, 3, and 4) are described below.

Figure 5A:
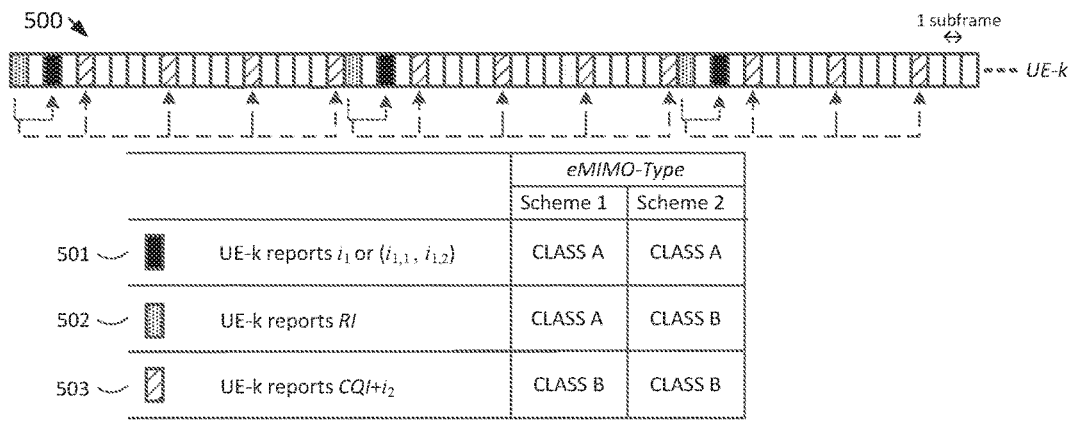
FIG. 5A illustrates two example schemes with a CSI process, two CSI-RS resources, and Class A as a first out of the two eMIMO-Types according to an embodiment of the present disclosure.

Schemes 1 and 2 are illustrated in UE timing diagram 500 (where one unit of reporting instances in this description is one subframe) of FIG. 5A. For illustrative purposes, the periodicity of RI and $i_1$ are assumed to be four times of CQI+$i_2$. For these two schemes, three reporting instances are used to report $i_1$ (501), RI (502), and CQI+$i_2$ (503), respectively. In this description, the UE calculates $i_1$, CQI, and $i_2$ conditioned on the last reported periodic RI. In both schemes, the calculation and reporting of $i_1$ are associated with 'CLASS A' ('nonPrecoded') eMIMO-Type whereas the calculation and reporting of CQI+$i_2$ are associated with 'CLASS B' ('nonPrecoded') eMIMO-Type.

For scheme 1, the calculation and reporting of RI are associated with 'CLASS A' ('nonPrecoded') eMIMO-Type. Therefore, the UE calculates $i_1$ and RI by measuring the same CSI-RS resource associated with the first CSI-RS resource configuration. For scheme 2, the calculation and reporting of RI are associated with 'CLASS B' ('beamformed') eMIMO-Type. Therefore, the UE calculates RI and CQI+$i_2$ by measuring the CSI-RS resource associated with the second CSI-RS resource configuration. For both schemes, $i_1$ can be conditioned upon the last reported periodic RI.

In the example illustration of FIG. 5A, the calculation and/or reporting of $i_1$ and CQI+$i_2$ are conditioned upon the same last reported periodic RI. Depending on the RI reporting configuration (periodicity and subframe offset), the last reported periodic RI for the subframe containing $i_1$ report can be different from that for CQI+$i_2$. This can happen, for example, when a periodic RI report occurs between an $i_1$ report and a CQI+$i_2$ report. In such cases, two alternatives exist. A first alternative is to introduce a rule to ensure that the calculation of the last reported $i_1$ and CQI+$i_2$ are conditioned on the same RI report (and hence same value of RI). An example of this rule is as follows: both $i_1$ (the first PMI value) and CQI+$i_2$ (CQI and the second PMI value or the single PMI value) are calculated conditioned on the last reported periodic RI prior to both the $i_1$ report and the CQI+$i_2$ report. A second alternative is to allow the RI report used to condition the calculation of the last reported $i_1$ to be different from the RI report used to condition the calculation of the last reported CQI+$i_2$. In this case, an example rule can be stated as follows: $i_1$ (the first PMI value) is calculated conditioned on the last reported periodic RI prior to the $i_1$ report and CQI+$i_2$ (CQI and the second PMI value or the single PMI value) is calculated conditioned on the last reported periodic RI prior to the CQI+$i_2$ report.

For the above schemes, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). For scheme 1, this parameter can indicate whether the UE reports RI, $i_1$, CQI+$i_2$ (three reports in separate subframes for Rel.13 legacy 'CLASS A' CSI reporting) or only RI+$i_1$. For scheme 2, this parameter can indicate whether the UE reports CQI+RI+$i_1$+$i_2$ (Rel.13 legacy 'CLASS A' CSI reporting) or only $i_1$.

For scheme 1, another RRC parameter related to 'CLASS B' ('beamformed') eMIMO-Type can be introduced (for example, RIdisabled-beamformed) to disable RI reporting and use the last reported periodic RI from the other CSI-RS resource configuration or eMIMO-Type. Alternatively, a standalone RRC parameter which can be used for any eMIMO-Type (for example, RIdisabled) can be introduced.

Alternatively, instead of using 'CLASS A' ('nonPrecoded') eMIMO-Type, another eMIMO-Type such as 'CLASS A-2' or 'CLASS C' with RI+$i_1$-only reporting for scheme 1 or $i_1$-only reporting for scheme 2 can be defined and used.

Figure 5B:
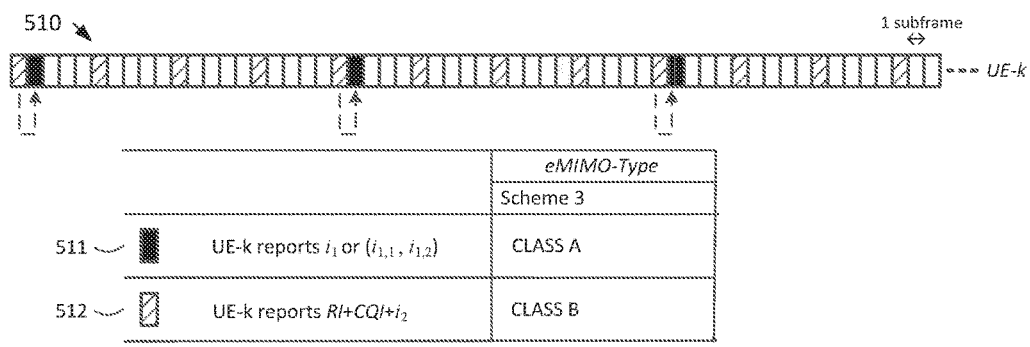
FIG. 5B illustrates an example scheme with a CSI process, two CSI-RS resources, and Class A as a first out of the two eMIMO-Types according to an embodiment of the present disclosure.

Scheme 3 is illustrated in UE timing diagram 510 (where one unit of reporting instances in this description is one subframe) of FIG. 5B. For illustrative purposes, the periodicity of $i_1$ is assumed to be four times of RI+CQI+$i_2$. For this scheme, two reporting instances are used to report $i_1$ (511) and RI+CQI+$i_2$ (512), respectively. In this case, RI is reported together with, and hence is configured with the same periodicity and subframe offset as CQI (and the second PMI $i_2$). In this description, the UE calculates $i_1$, CQI, and $i_2$ conditioned on the last reported periodic RI. Therefore, for a subframe of 701 where the UE reports $i_1$, the last reported periodic RI is included in the most recent subframe of 702 where RI+CQI+$i_2$ is reported. In this scheme, the calculation and reporting of $i_1$ are associated with 'CLASS A' ('nonPrecoded') eMIMO-Type whereas the calculation and reporting of RI, CQI, $i_2$ are associated with 'CLASS B' ('nonPrecoded') eMIMO-Type.

For scheme 3, the UE calculates $i_1$ (the first PMI value) by measuring the CSI-RS resource associated with the first CSI-RS resource configuration (corresponding to 'CLASS A'/'nonPrecoded' eMIMO-Type). The UE calculates RI and CQI+$i_2$ by measuring the CSI-RS resource associated with the second CSI-RS resource configuration (corresponding to 'CLASS B'/'beamformed' eMIMO-Type).

Similar to schemes 1 and 2, for scheme 3, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only $i_1$.

Alternatively, instead of using 'CLASS A' ('nonPrecoded') eMIMO-Type, another eMIMO-Type such as 'CLASS A-2' or 'CLASS C' with $i_1$-only reporting can be defined and used.

Figure 5C:
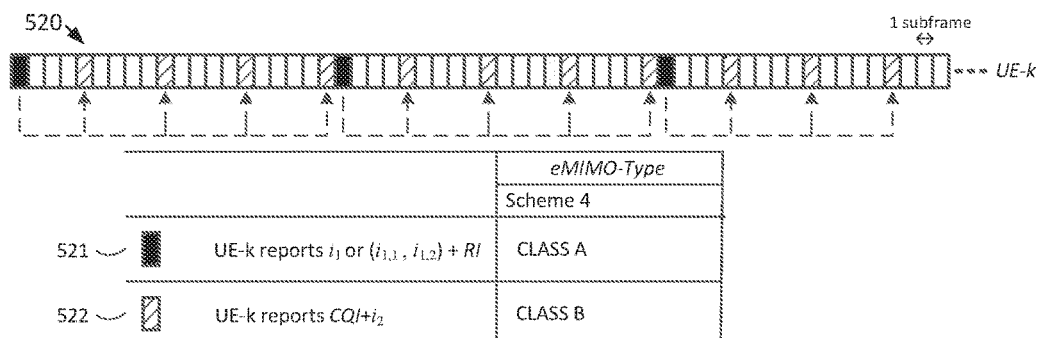
FIG. 5C illustrates an example scheme with a CSI process, two CSI-RS resources, and Class A as a first out of the two eMIMO-Types according to an embodiment of the present disclosure.

Scheme 4 is illustrated in UE timing diagram 520 (where one unit of reporting instances in this description is one subframe) of FIG. 5C. For illustrative purposes, the periodicity of RI+$i_1$ is assumed to be four times of CQI+$i_2$. For this scheme, two reporting instances are used to report RI+$i_1$ (521) and CQI+$i_2$ (522), respectively. In this case, RI is reported together with, and hence is configured with the same periodicity and subframe offset as $i_1$ (the first PMI value). In this description, the UE calculates $i_1$, CQI, and $i_2$ conditioned on the last reported periodic RI which is reported together with the first PMI value $i_1$. In this scheme, the calculation and reporting of $i_1$ and RI are associated with 'CLASS A' ('nonPrecoded') eMIMO-Type whereas the calculation and reporting of CQI and $i_2$ are associated with 'CLASS B' ('nonPrecoded') eMIMO-Type. Therefore, CQI and $i_2$, which are associated with 'CLASS B' ('beamformed') eMIMO-Type, are calculated conditioned on the last reported periodic RI which is associated with 'CLASS A' ('nonPrecoded') eMIMO-Type within a same CSI process.

For scheme 4, the UE calculates $i_1$ (the first PMI value) and RI by measuring the CSI-RS resource associated with the first CSI-RS resource configuration (corresponding to 'CLASS A'/'nonPrecoded' eMIMO-Type). The UE calculates CQI+$i_2$ by measuring the CSI-RS resource associated with the second CSI-RS resource configuration (corresponding to 'CLASS B'/'beamformed' eMIMO-Type).

Similar to schemes 1 and 2, for scheme 4, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only RI+$i_1$.

In addition, another RRC parameter related to 'CLASS B' ('beamformed') eMIMO-Type can be introduced (for example, RIdisabled-beamformed) to disable RI reporting and use the last reported periodic RI from the other CSI-RS resource configuration or eMIMO-Type. Alternatively, a standalone RRC parameter which can be used for any eMIMO-Type (for example, RIdisabled) can be introduced. Alternatively, instead of using 'CLASS A' ('nonPrecoded') eMIMO-Type, another eMIMO-Type such as 'CLASS A-2' or 'CLASS C' with RI+$i_1$-only reporting can be defined and used.

For any of the four schemes in this first sub-embodiment, at least two alternatives exist in the relation between the calculation of the first PMI value $i_1$ (associated with 'CLASS A'/'nonPrecoded' eMIMO-Type) and the second or single PMI value $i_2$ (associated with 'CLASS B'/'beamformed' eMIMO-Type). In a first alternative, the calculation of $i_1$ and $i_2$ can be dependent on each other. This is applicable when $i_1$ (which can include one component or two components $\{i_{1,1}, i_{1,2}\}$) and $i_2$ are two indices of a same 'CLASS A' codebook. Therefore, $i_2$ is calculated conditioned upon the first PMI $i_1$ (which can include one component or two components $\{i_{1,1}, i_{1,2}\}$). In a second alternative, the calculation of $i_1$ and $i_2$ can be independent on each other. Although applicable when $i_1$ (which can include one component or two components $\{i_{1,1}, i_{1,2}\}$) and $i_2$ are two indices of a same 'CLASS A' codebook, this is more relevant when $i_1$ (which can include one component or two components $\{i_{1,1}, i_{1,2}\}$) is the first index of a 'CLASS A' codebook while $i_2$ is the index of a 'CLASS B' codebook different from the CLASS A' codebook.

A second sub-embodiment is to associate a first CSI-RS resource (or CSI-RS resource configuration) with a first CSI process and a second CSI-RS resource (or CSI-RS resource configuration) with a second CSI process. In this sub-embodiment, each CSI process (and hence CSI-RS resource or CSI-RS resource configuration) is assigned a CSI reporting configuration. Therefore, two sets of CSI calculations and reports associated with the two CSI process can be defined independently—that is, one set of CSI reports is not calculated assuming the other one.

The above four schemes (as illustrated in FIGS. 5A, 5B, and 5C) of the first sub-embodiment are also applicable to the second sub-embodiment. But since only one RI reporting is used in these four schemes, only one of the two configured CSI processes is configured with RI reporting. For this purpose, one of the two configured CSI processes is set as 'RI-reference CSI process'. Denoting these four schemes (as illustrated in FIGS. 5A, 5B, and 5C) as schemes 1B, 2B, 3B, and 4B, respectively, they can be described as follows.

Scheme 1B can be described similarly to scheme 1 with the CSI process associated with 'CLASS A' ('nonPrecoded') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the 'configured RI-reference CSI process' (in this case, the CSI process associated with the CSI process configured with 'CLASS A' ('nonPrecoded') eMIMO-Type) in the most recent RI reporting instance for the CSI process.

Scheme 2B can be described similarly to scheme 2 with the CSI process associated with 'CLASS B' ('beamformed') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the configured RI-reference CSI process' (in this case, the CSI process configured with 'CLASS B' ('beamformed') eMIMO-Type) in the most recent RI reporting instance for the CSI process.

Scheme 3B can be described similarly to scheme 3 with the CSI process associated with 'CLASS B' ('beamformed') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the configured RI-reference CSI process' (in this case, the CSI process configured with 'CLASS B' ('beamformed') eMIMO-Type) in the most recent RI reporting instance for the CSI process.

Scheme 4B can be described similarly to scheme 4 with the CSI process associated with 'CLASS A' ('nonPrecoded') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the 'configured RI-reference CSI process' (in this case, the CSI process associated with the CSI process configured with 'CLASS A' ('nonPrecoded') eMIMO-Type) in the most recent RI reporting instance for the CSI process.

In the present disclosure, three additional example schemes (schemes 5, 6, and 7) for the second sub-embodiment are described below.

Figure 5D:
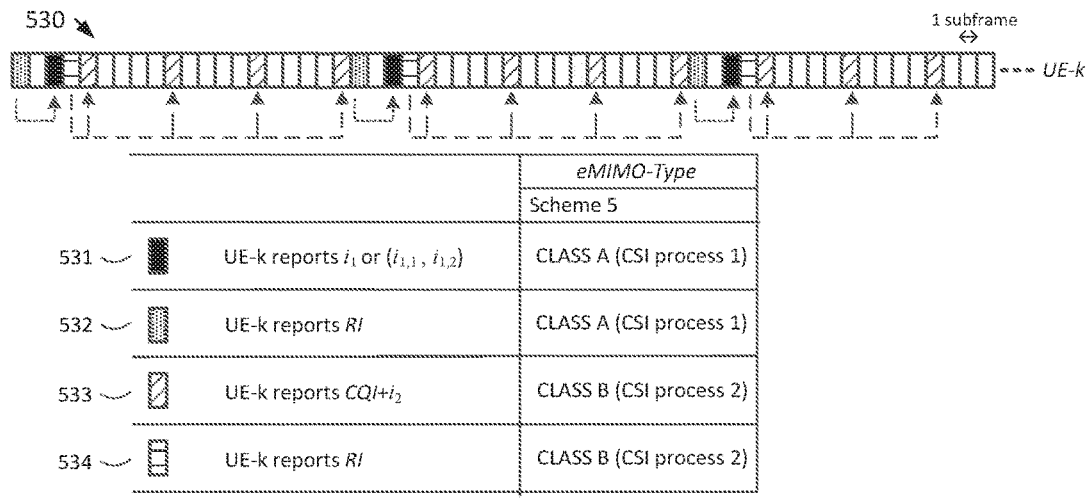
FIG. 5D illustrates an example scheme with two CSI processes, two CSI-RS resources, and Class A as a first out of the two eMIMO-Types according to an embodiment of the present disclosure.

Scheme 5 can be illustrated in UE timing diagram 530 (where one unit of reporting instances in this description is one subframe) of FIG. 5D. For illustrative purposes, the periodicity of two RI reports (532 and 534) and $i_1$ (531) are assumed to be four times of CQI+$i_2$ (533). For this scheme, four reporting instances are used to report $i_1$ (531), RI associated with the same CSI process and CSI-RS resource configuration as $i_1$ (532), and CQI+$i_2$ (533), and RI associated with the same CSI process and CSI-RS resource configuration as CQI+$i_2$ (534), respectively. In this description, the UE calculates $i_1$ conditioned on the last reported periodic RI in a first CSI process configured with 'CLASS A' ('nonPrecoded') eMIMO-Type. The UE calculates CQI and $i_2$ conditioned on the last reported periodic RI in a second CSI process configured with 'CLASS B' ('beamformed') eMIMO-Type.

For scheme 5, the UE calculates $i_1$ (the first PMI value) and a RI by measuring the CSI-RS resource associated with the first CSI-RS resource configuration (corresponding to 'CLASS A'/'nonPrecoded' eMIMO-Type). The UE calculates a RI (different from the first RI) and CQI+$i_2$ by measuring the CSI-RS resource associated with the second CSI-RS resource configuration (corresponding to 'CLASS B'/'beamformed' eMIMO-Type). For scheme 5, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only RI and $i_1$.

In a variation of this embodiment, the RI reporting associated with the first eMIMO-Type of 'CLASS A' ('nonPrecoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO-Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports 532 and 534 can be calculated independently of each other. Alternatively, an additional restriction can be imposed. For example, if a UE is configured with two CSI processes, one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type is not greater than that associated with 'CLASS A'/'nonPrecoded' eMIMO-Type. Or the second RI is of the same value as the first RI.

Figure 5E:
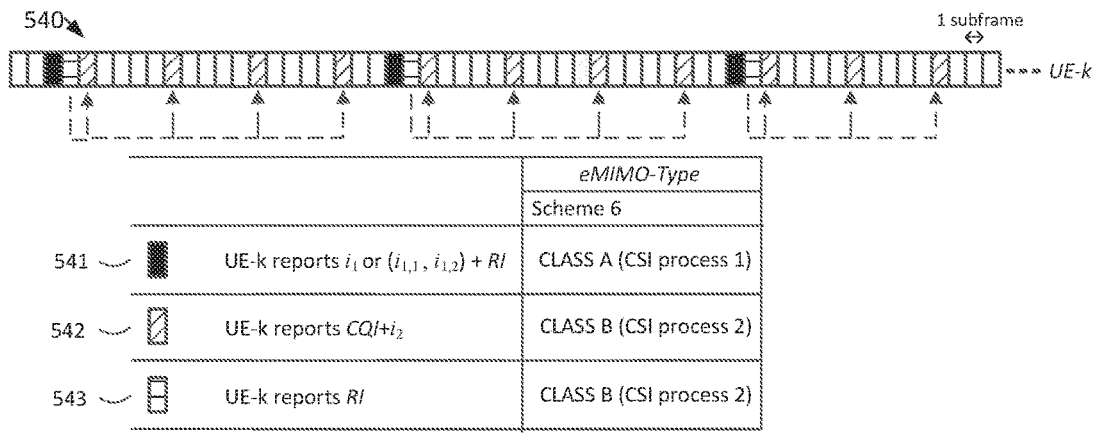
FIG. 5E illustrates an example scheme with two CSI processes, two CSI-RS resources, and Class A as a first out of the two eMIMO-Types according to an embodiment of the present disclosure.

Scheme 6 can be illustrated in UE timing diagram 540 (where one unit of reporting instances in this description is one subframe) of FIG. 5E. For illustrative purposes, the periodicity of two RI reports (in 541 and 543) and $i_1$ (in 541) are assumed to be four times of CQI+$i_2$ (542). For this scheme, three reporting instances are used to report RI+$i_1$ (541) associated with a first CSI process and CSI-RS resource configuration, CQI+$i_2$ (542), and RI associated with the same CSI process and CSI-RS resource configuration as CQI+$i_2$ (542), respectively. In this description, the UE calculates $i_1$ conditioned on the last reported periodic RI in a first CSI process configured with 'CLASS A' ('nonPrecoded') eMIMO-Type which is reported together with $i_1$ (in 541). The UE calculates CQI and $i_2$ conditioned on the last reported periodic RI in a second CSI process configured with 'CLASS B' ('beamformed') eMIMO-Type (in 543).

For scheme 6, the UE calculates $i_1$ (the first PMI value) and a RI by measuring the CSI-RS resource associated with the first CSI-RS resource configuration (corresponding to 'CLASS A'/'nonPrecoded' eMIMO-Type). The UE calculates a RI (different from the first RI) and CQI+$i_2$ by measuring the CSI-RS resource associated with the second CSI-RS resource configuration (corresponding to 'CLASS B'/'beamformed' eMIMO-Type). For scheme 6, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only RI+$i_1$.

In a variation of this embodiment, the RI reporting associated with the first eMIMO-Type of 'CLASS A' ('non-Precoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO-Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports in 541 and 543 can be calculated independently of each other. Alternatively, an additional restriction can be imposed. For example, if a UE is configured with two CSI processes, one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type is not greater than that associated with 'CLASS A'/'nonPrecoded' eMIMO-Type. Or the second RI is of the same value as the first RI.

Figure 5F:
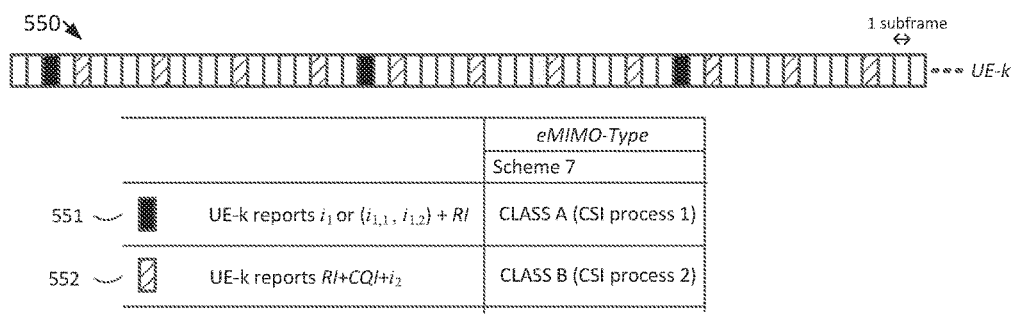
FIG. 5F illustrates an example scheme with two CSI processes, two CSI-RS resources, and Class A as a first out of the two eMIMO-Types according to an embodiment of the present disclosure.

Scheme 7 can be illustrated in UE timing diagram 550 (where one unit of reporting instances in this description is one subframe) of FIG. 5F. For illustrative purposes, the periodicity of a first RI report and $i_1$ (in 551) is assumed to be four times of the second RI report and CQI+$i_2$ (552). For this scheme, two reporting instances are used to report RI+$i_1$ (551) associated with a first CSI process and CSI-RS resource configuration, and RI+CQI+$i_2$ (552) associated with the same CSI process and CSI-RS resource configuration. In this description, the UE calculates $i_1$ conditioned on the last reported periodic RI in a first CSI process configured with 'CLASS A' ('nonPrecoded') eMIMO-Type which is reported together with $i_1$ (in 551). The UE calculates CQI and $i_2$ conditioned on the last reported periodic RI in a second CSI process configured with 'CLASS B' ('beamformed') eMIMO-Type which is reported together with CQI and $i_2$ (in 552).

For scheme 7, the UE calculates $i_1$ (the first PMI value) and its companion RI by measuring the CSI-RS resource associated with the first CSI-RS resource configuration (corresponding to 'CLASS A'/'nonPrecoded' eMIMO-Type). The UE calculates CQI+$i_2$ and its companion RI by measuring the CSI-RS resource associated with the second CSI-RS resource configuration (corresponding to 'CLASS B'/'beamformed' eMIMO-Type). For scheme 7, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, iIonlyCSI-nonPrecoded). This parameter can indicate whether the UE reports RI, $i_1$, CQI+$i_2$ (three reports in separate subframes for Rel.13 legacy 'CLASS A' CSI reporting) or only RI+$i_1$.

In a variation of this embodiment, the RI reporting associated with the first eMIMO-Type of 'CLASS A' ('nonPrecoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO-Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports in 551 and 552 can be calculated independently of each other. Alternatively, an additional restriction can be imposed. For example, if a UE is configured with two CSI processes, one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type is not greater than that associated with 'CLASS A'/'nonPrecoded' eMIMO-Type. Or the second RI is of the same value as the first RI.

A third sub-embodiment, similar to the first sub-embodiment, is to associate both a first CSI-RS resource (or CSI-RS resource configuration) and a second CSI-RS resource (or CSI-RS resource configuration) with a single CSI process. Therefore, CSI reports and calculations associated with the two CSI-RS resources (or CSI-RS resource configurations) can be either dependent on or independent of each other—that is, the two CSI reports are associated with one CSI reporting configuration. However, different from the first sub-embodiment, schemes of this sub-embodiment category allow RI reporting to occur twice (one RI for one CSI-RS resource). The example schemes illustrated in FIGS. 5D, 5E, and 5F can be extended for this third sub-embodiment. They are denoted as schemes 5B, 6B, and 7B, respectively, and can be described as follows.

Figure 6A:
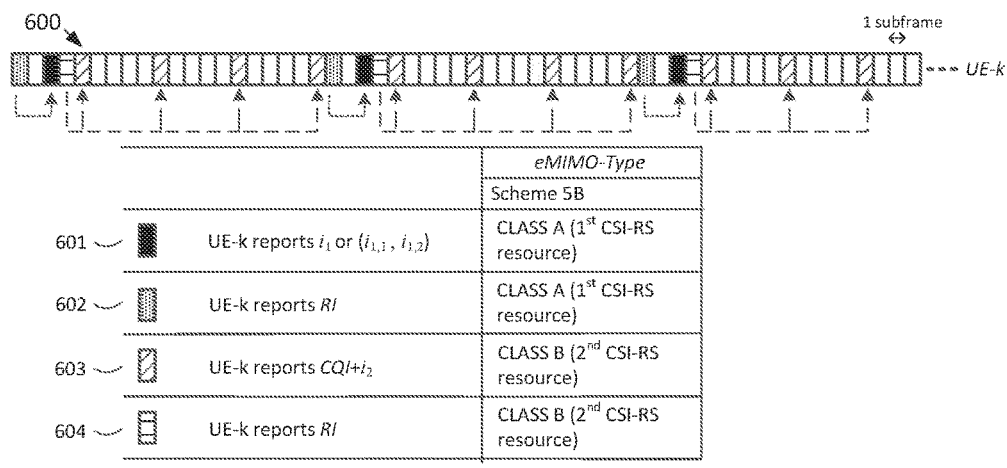
FIG. 6A illustrates an example scheme with a CSI process, two CSI-RS resources, and Class A as a first out of the two eMIMO-Types according to an embodiment of the present disclosure.

Scheme 5B can be illustrated in UE timing diagram 600 (where one unit of reporting instances in this description is one subframe) of FIG. 6A. For illustrative purposes, the periodicity of two RI reports (602 and 604) and $i_1$ (601) are assumed to be four times of CQI+$i_2$ (603). For this scheme, four reporting instances are used to report $i_1$ (601), RI associated with the same CSI-RS resource (or CSI-RS resource configuration) as $i_1$ (602), and CQI+$i_2$ (603), and RI associated with the same CSI-RS resource (or CSI-RS resource configuration) as CQI+$i_2$ (604), respectively. In this description, the UE calculates $i_1$ conditioned on the last reported periodic RI in a first CSI-RS resource (or CSI-RS resource configuration) configured with 'CLASS A' ('nonPrecoded') eMIMO-Type. The UE calculates CQI and $i_2$ conditioned on the last reported periodic RI in a second CSI-RS resource (or CSI-RS resource configuration) configured with 'CLASS B' ('beamformed') eMIMO-Type.

For scheme 5B, the UE calculates $i_1$ (the first PMI value) and a (first) RI by measuring the CSI-RS resource associated with the first CSI-RS resource configuration (corresponding to 'CLASS A'/'nonPrecoded' eMIMO-Type). The UE calculates a RI (different from the first RI) and CQI+$i_2$ by measuring the CSI-RS resource associated with the second CSI-RS resource configuration (corresponding to 'CLASS B'/'beamformed' eMIMO-Type). For scheme 5B, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, iIonlyCSI-nonPrecoded). This parameter can indicate whether the UE reports RI, $i_1$, CQI+$i_2$ (three reports in separate subframes for Rel.13 legacy 'CLASS A' CSI reporting) or only RI and $i_1$.

In a variation of this embodiment, the RI reporting associated with the first eMIMO-Type of 'CLASS A' ('nonPrecoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO- Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports 602 and 604 can be calculated independently of each other. Alternatively, an additional restriction can be imposed. For example, if a UE is configured with two CSI-RS resources (or CSI-RS resource configurations), one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type i snot greater than that associated with 'CLASS A'/'nonPrecoded' eMIMO-Type. Or the second RI is of the same value as the first RI.

Figure 6B:
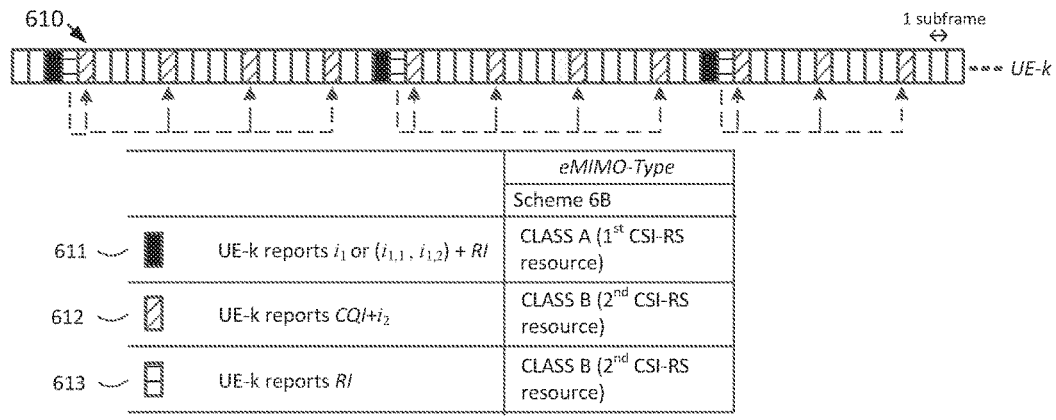
FIG. 6B illustrates an example scheme with a CSI process, two CSI-RS resources, and Class A as a first out of the two eMIMO-Types according to an embodiment of the present disclosure.

Scheme 6B can be illustrated in UE timing diagram 610 (where one unit of reporting instances in this description is one subframe) of FIG. 6B. For illustrative purposes, the periodicity of two RI reports (in 611 and 613) and $i_1$ (in 611) are assumed to be four times of CQI+$i_2$ (612). For this scheme, three reporting instances are used to report RI+$i_1$ (611) associated with a first CSI-RS resource (or CSI-RS resource configuration), CQI+$i_2$ (612), and RI associated with the same CSI-RS resource (or CSI-RS resource configuration) as CQI+$i_2$ (612), respectively. In this description, the UE calculates $i_1$ conditioned on the last reported periodic RI in a first CSI-RS resource (or CSI-RS resource configuration) configured with 'CLASS A' ('nonPrecoded') eMIMO-Type which is reported together with $i_1$ (in 611). The UE calculates CQI and $i_2$ conditioned on the last reported periodic RI in a second CSI-RS resource (or CSI-RS resource configuration) configured with 'CLASS B' ('beamformed') eMIMO-Type (in 613).

For scheme 6B, the UE calculates $i_1$ (the first PMI value) and a RI by measuring the CSI-RS resource associated with the first CSI-RS resource configuration (corresponding to 'CLASS A'/'nonPrecoded' eMIMO-Type). The UE calculates a RI (different from the first RI) and CQI+$i_2$ by measuring the CSI-RS resource associated with the second CSI-RS resource configuration (corresponding to 'CLASS B'/'beamformed' eMIMO-Type). For scheme 6B, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only RI+i+$_1$.

In a variation of this embodiment, the RI reporting associated with the first eMIMO-Type of 'CLASS A' ('nonPrecoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO-Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports in 611 and 613 can be calculated independently of each other. Alternatively, an additional restriction can be imposed. For example, if a UE is configured with two CSI-RS resources (or CSI-RS resource configurations), one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type is not greater than that associated with 'CLASS A'/'nonPrecoded' eMIMO-Type. Or the second RI is of the same value as the first RI.

Figure 6C:
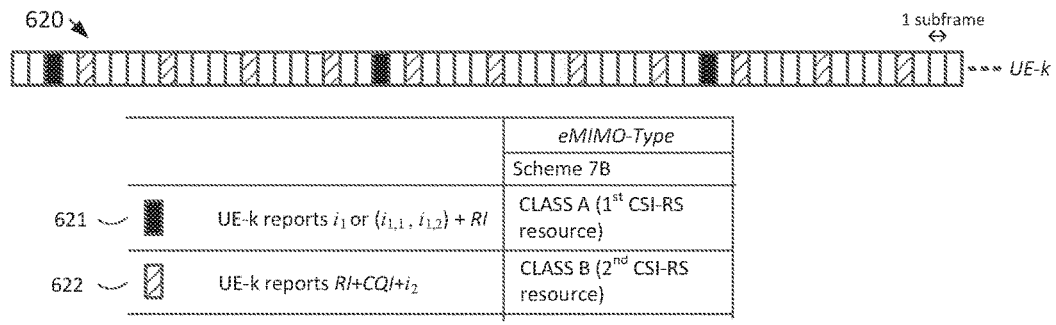
FIG. 6C illustrates an example scheme with a CSI process, two CSI-RS resources, and Class A as a first out of the two eMIMO-Types according to an embodiment of the present disclosure.

Scheme 7B can be illustrated in UE timing diagram 620 (where one unit of reporting instances in this description is one subframe) of FIG. 6C. For illustrative purposes, the periodicity of a first RI report and $i_1$ (in 621) is assumed to be four times of the second RI report and CQI+$i_2$ (622). For this scheme, two reporting instances are used to report RI+$i_1$ (621) associated with a first CSI-RS resource (or CSI-RS resource configuration), and RI+CQI+$i_2$ (622) associated with the same CSI-RS resource (or CSI-RS resource configuration). In this description, the UE calculates $i_1$ conditioned on the last reported periodic RI in a first CSI-RS resource (or CSI-RS resource configuration) configured with 'CLASS A' ('nonPrecoded') eMIMO-Type which is reported together with $i_1$ (in 621). The UE calculates CQI and $i_2$ conditioned on the last reported periodic RI in a second CSI-RS resource (or CSI-RS resource configuration) configured with 'CLASS B' ('beamformed') eMIMO-Type which is reported together with CQI and $i_2$ (in 622).

For scheme 7B, the UE calculates $i_1$ (the first PMI value) and its companion RI by measuring the CSI-RS resource associated with the first CSI-RS resource configuration (corresponding to 'CLASS A'/'nonPrecoded' eMIMO-Type). The UE calculates CQI+$i_2$ and its companion RI by measuring the CSI-RS resource associated with the second CSI-RS resource configuration (corresponding to 'CLASS B'/'beamformed' eMIMO-Type). For scheme 7B, 'CLASS A' ('nonPrecoded') eMIMO-Type is used for the first CSI-RS resource (or CSI-RS resource configuration). In this case, another RRC parameter related to 'CLASS A' ('nonPrecoded') eMIMO-Type can be introduced (for example, ilonlyCSI-nonPrecoded). This parameter can indicate whether the UE reports RI, $i_1$, CQI+$i_2$ (three reports in separate subframes for Rel.13 legacy 'CLASS A' CSI reporting) or only RI+$i_1$.

In a variation of this embodiment, the RI reporting associated with the first eMIMO-Type of 'CLASS A' ('nonPrecoded') can be enabled or disabled. Such configurability can be attained, for example, via higher-layer signaling using an RRC parameter which enables or disables RI reporting (for example, RIenabled). Therefore, when RI reporting is enabled, RI+$i_1$ is reported for the first eMIMO-Type of 'CLASS A' ('nonPrecoded'). When RI reporting is disabled, only $i_1$ is reported for the first eMIMO-Type of 'CLASS A' ('nonPrecoded'). Alternatively, instead of using 'CLASS A' ('nonPrecoded') eMIMO-Type, another eMIMO-Type such as 'CLASS A-2' or 'CLASS C' with $i_1$-only reporting can be defined and used.

The two RI reports in 621 and 622 can be calculated independently of each other. Alternatively, an additional restriction can be imposed. For example, if a UE is configured with two CSI-RS resources (or CSI-RS resource configurations), one associated with 'CLASS A'/'nonPrecoded' eMIMO-Type, another associated with 'CLASS B'/'beamformed' eMIMO-Type, the last reported periodic RI associated with 'CLASS B'/'beamformed' eMIMO-Type is not greater than that associated with 'CLASS A'/'nonPrecoded' eMIMO-Type. Or the second RI is of the same value as the first RI.

In the above example schemes of the first embodiment, the first PMI value feedback $i_1$ associated with 'CLASS A' ('nonPrecoded') eMIMO-Type is conditioned on the last reported periodic RI associated with either a same or different CSI-RS resource (or CSI-RS resource configuration). In an alternative embodiment, this PMI report/feedback can include more than one values of $i_1$, each associated with a value of RI. These multiple values of RI can either be predetermined/specified/fixed, configured for a UE via higher-layer (RRC) signaling, or reported together with the multiple values of $i_1$. For both the second and the third possibility, the number of values of RI can either be predetermined/specified/fixed or configured via higher-layer (RRC) signaling. For the third possibility, the UE reports multiple RI+$i_1$ combinations in one complete CSI report. Such multiple RI+$i_1$ combinations can be signaled together within one reporting instance or multiple reporting instances.

For the sub-embodiments of the first embodiment, the first PMI value $i_1$ associated with 'CLASS A' (nonPrecoded') eMIMO-Type can be replaced by a different type of feedback such as channel quantization feedback, quantized eigenvectors, or quantized channel covariance matrix. In such cases, the UE does not report the RI associated with 'CLASS A' (nonPrecoded') eMIMO-Type. Alternatively, RI can be reported but represents a channel characteristic such as channel rank or the number of eigenvalues or singular values which indicates the dimensionality of the channel or the number of channel vectors reported by the UE.

In a second embodiment, a first set of K CSI-RS resources (or CSI-RS resource configurations) is associated with eMIMO-Type of 'CLASS B' ('beamformed') with K>1 CSI-RS resources (or CSI-RS resource configurations) and a second CSI-RS resource (or CSI-RS resource configuration) is associated with eMIMO-Type of 'CLASS B' ('beamformed') with one CSI-RS resource (or CSI-RS resource configuration). The total number of CSI-RS ports of the first set $P_1 = \Sigma_{i=1}^{K} P_{1,i}$ is greater than or equal to the number of CSI-RS ports of the second CSI-RS resource $P_2$. Similar to the first embodiment, two sub-embodiments are possible for periodic CSI (P-CSI) reporting. In a first sub-embodiment, both the first set of K CSI-RS resources and the second CSI-RS resource can be associated with one CSI process. In a second sub-embodiment, the first set of K CSI-RS resources is associated with a first CSI process and the second CSI-RS resource with a second CSI process. The 'CLASS B' ('beamformed') eMIMO-Type associated with the first set of K CSI-RS resources can be configured with or without CRI (CSI-RS resource index) reporting. This feature can be used to aggregate K CSI-RS resources into a total of $P_1 = \Sigma_{i=1}^{K} P_{1,i}$ CSI-RS ports, offering a subsampled $P_1$-port CSI-RS. For periodic CSI-RS resource configuration, such subsampling can be performed in time (subframe level), frequency (sub-carrier level), and/or port domain(s).

For the first sub-embodiment of this second embodiment, four schemes analogous to the four schemes (1, 2, 3, and 4) of the first sub-embodiment of the first embodiment apply. The four schemes can be described in a similar manner to that given in FIG. 5A (schemes 1 and 2), 5B (scheme 3), and 5C (scheme 4), respectively, except that 'CLASS A' ('nonPrecoded') eMIMO-Type and its associated one CSI-RS resource (or resource configuration) are substituted with 'CLASS B' (beamformed) eMIMO-Type and its associated K CSI-RS resources (or resource configurations). Their extensions analogous to the second sub-embodiment of the first embodiment (termed schemes 1A, 2A, 3A, and 4A) can be described similarly-substituting 'CLASS A' ('nonPrecoded') eMIMO-Type and its associated one CSI-RS resource (or resource configuration) with 'CLASS B' (beamformed) eMIMO-Type and its associated K CSI-RS resources (or resource configurations).

When only one CSI process is used for both eMIMO-Type settings just as in the first sub-embodiment of this second embodiment, an additional higher layer (RRC) signaling can be introduced to indicate a function of a 'CLASS B' ('beamformed') eMIMO-Type. This function can correspond to CSI reporting such as the content of one CSI report. For example, for the first 'CLASS B' ('beamformed') eMIMO-Type with K CSI-RS resources (or resource configurations), a CSI report can include a set of K CSI reports, each corresponding to one of the K CSI-RS resources (or resource configurations) and each CSI report can include RI, CQI, and PMI derived from a particular choice of codebook for $P_{1,i}$-port CSI-RS (for the i-th CSI-RS resource). Since this set of K CSI reports can be used by the eNB to estimate CSI for $P_1$-port CSI-RS, these CSI reports can correspond to a same value of RI. For the second 'CLASS B' ('beamformed') eMIMO-Type with one CSI-RS resource (or resource configuration), its corresponding CSI report can include RI, CQI, and PMI derived from a particular choice of codebook for $P_2$-port CSI-RS which can be the same as or different from the first choice of codebook. Therefore, this embodiment can be implemented with including a codebook selection parameter for each CSI-RS resource or resource configuration (in this case, each of the K+1 CSI-RS resources of resource configurations). This resource- or resource-configuration-specific codebook selection RRC parameter (termed, for example, CBSelect_CSI-RS_Resource) can be introduced in an NZP CSI-RS resource configuration information element (IE).

This additional higher layer signaling can also be used for a second sub-embodiment where the first set of K CSI-RS resources is associated with a first CSI process and the second CSI-RS resource with a second CSI process.

A codebook used for a CSI-RS resource can be described in two indices or PMI values $i_1$ and $i_2$. Similar to the first embodiment, PMI $i_1$ denotes the PMI associated with the first index. Depending on the codebook configuration, this first index $i_1$ can include one component or two components $\{i_{1,1}, i_{1,2}\}$. The other PMI $i_2$ denotes the second index of this i codebook. Alternatively, a codebook used for a CSI-RS resource can be described in one index or PMI value $i_2$.

In a variation of this first sub-embodiment of the second embodiment, when CRI is reported by the UE for the first set of K CSI-RS resources (associated with eMIMO-Type of 'CLASS B' ('beamformed') with K>1 CSI-RS resources (or CSI-RS resource configurations)), instead of reporting K CSI reports (each associated with one of the K CSI-RS resources), the UE reports only one CSI containing only CRI (without CQI, without PMI, and without RI). This CRI indicates a recommended selection of one out of K CSI-RS resources. For the second set of one CSI-RS resource (associated with eMIMO-Type of 'CLASS B' ('beamformed') with one CSI-RS resource (or CSI-RS resource configuration)), the UE reports one CSI containing CQI, PMI, and RI based on a codebook for $P_2$-port CSI-RS. This CSI calculation is conditioned on the last reported periodic CRI associated with the first set of K CSI-RS resources. Note that although CRI is calculated from the first set of K>1 CSI-RS resources and RI from the second set of one CSI-RS resource, CRI can be reported together with RI in a same subframe whenever CRI is reported. This follows the procedure in Rel.13 LTE. Alternatively, CRI can be reported separately (in a different subframe) from this RI.

In a variation of the above scheme, when CRI is reported by the UE for the first set of K CSI-RS resources (associated with eMIMO-Type of 'CLASS B' ('beamformed') with K>1 CSI-RS resources (or CSI-RS resource configurations)), both CRI and RI are calculated from this first set of K CSI-RS resources. Here RI is calculated or determined conditioned on the reported CRI (recommended selection of one out of K CSI-RS resources). For the second set of one CSI-RS resource (associated with eMIMO-Type of 'CLASS B' ('beamformed') with one CSI-RS resource (or CSI-RS resource configuration)), the UE reports one CSI containing CQI and PMI (without RI), based on a codebook for $P_2$-port CSI-RS. This CSI calculation is conditioned on the last reported periodic CRI and the last reported periodic RI associated with the first set of K CSI-RS resources. Note that CRI can be reported together with RI in a same subframe whenever CRI is reported. This follows the procedure in Rel.13 LTE. Alternatively, CRI can be reported separately (in a different subframe) from this RI.

In yet another variation of this first sub-embodiment of the second embodiment, a first set of K=2 CSI-RS resources (or CSI-RS resource configurations) is associated with eMIMO-Type of 'CLASS B' ('beamformed') with K=2 CSI-RS resources (or CSI-RS resource configurations) and a second CSI-RS resource (or CSI-RS resource configuration) is associated with eMIMO-Type of 'CLASS B' ('beamformed') with one CSI-RS resource (or CSI-RS resource configuration). For the first set of K=2 CSI-RS resources (the first CSI-RS resource with $P_{1,1}$ ports and the second CSI-RS resource with $P_{1,2}$ ports), just as in the first embodiment, the UE can be configured to report only some of the CSI parameters. For example, for the first $P_{1,1}$-port CSI-RS, the UE can report either RI+$i_{1,1}$ only or $i_{1,1}$ only. For the second $P_{1,2}$-port CSI-RS, the UE can report either RI+$i_{1,2}$ only or $i_{1,2}$ only. Either one of the two CSI reports or both CSI reports can be reported with or without RI. If only one of the two CSI reports (labelled as CSI report A) contains an RI, the other CSI report (labelled CSI report B) associated with the other CSI-RS resource is calculated conditioned on the RI from CSI report A. If each of the two CSI reports contains an RI, the two values of RI can be determined independently or set the same (for example, by setting one of CSI-RS resources as a reference for RI reporting). For the second set of one CSI-RS resource (associated with eMIMO-Type of 'CLASS B' ('beamformed') with one CSI-RS resource (or CSI-RS resource configuration)), the UE reports one CSI containing CQI, PMI, and RI based on a codebook for $P_2$-port CSI-RS. Alternatively, if RI is already reported for the first set of K=2 CSI-RS resources, only CQI+PMI can be reported for this $P_2$-port CSI-RS. In this case, CQI and PMI are calculated conditioned on the last reported periodic RI associated with the first set of K=2 CSI-RS resources (associated with eMIMO-Type of 'CLASS B' ('beamformed') with K=2 CSI-RS resources (or CSI-RS resource configurations)).

For calculating $i_{1,1}$ and $i_{1,2}$, a two-dimensional codebook such as a codebook used for 'CLASS A' eMIMO-Type can be used where the codebook parameters ($N_1$, $N_2$) are set to either ($P_{1,1}$, $P_{1,2}$) or ($P_{1,1}/2$, $P_{1,2}$), respectively. This implies that $i_{1,1}$ and $i_{1,2}$ are intended to represent two components of first PMI $i_{1,1}$ associated with $2P_{1,1}P_{1,2}$ or $P_{1,1}P_{1,2}$ CSI-RS ports. In this case, the calculation of $i_{1,1}$ and $i_{1,2}$ can be either independent or dependent on each other. For instance, $i_{1,2}$ is calculated conditioned on the last reported periodic $i_{1,1}$, or vice versa.

Alternatively, $i_{1,1}$ can be calculated using a $P_{1,1}$-port codebook while $i_{1,2}$ can be calculated using a $P_{1,2}$-port codebook. Likewise, the calculation of $i_{1,1}$ and $i_{1,2}$ can be either independent or dependent on each other. For instance, $i_{1,2}$ is calculated conditioned on the last reported periodic $i_{1,1}$, or vice versa. When more than one choices of codebook are available for a given number of CSI-RS ports (for each of the two PMI components), a codebook selection parameter for each CSI-RS resource or resource configuration (in this case, each of the two CSI-RS resources of resource configurations). This resource- or resource-configuration-specific codebook selection RRC parameter (termed, for example, CBSelect_CSI-RS_Resource) can be introduced in an NZP CSI-RS resource configuration information element (IE).

For the second sub-embodiment of this second embodiment, three schemes analogous to the four schemes (5, 6, and 7) of the second sub-embodiment of the first embodiment apply. The three schemes can be described in a similar manner to that given in FIG. 5D (scheme 5), 5E (scheme 6), and 5F (scheme 7), respectively, except that 'CLASS A' ('nonPrecoded') eMIMO-Type and its associated one CSI-RS resource (or resource configuration) are substituted with 'CLASS B' (beamformed) eMIMO-Type and its associated K CSI-RS resources (or resource configurations).

When two CSI processes are used (one for the first 'CLASS B' eMIMO-Type with K CSI-RS resources, another for the second 'CLASS B' eMIMO-Type with 1 CSI-RS resources), a codebook selection indicator can be introduced for each of the two CSI processes.

In a third embodiment, an aperiodic CSI (A-CSI) counterpart of the first embodiment, a first CSI-RS resource (or CSI-RS resource configuration) is associated with eMIMO-Type of 'CLASS A' ('nonPrecoded') and a second CSI-RS resource (or CSI-RS resource configuration) is associated with eMIMO-Type of 'CLASS B' ('beamformed'). In this case, 'CLASS B' ('beamformed') is associated with one CSI-RS resource. The number of CSI-RS ports for the first 'CLASS A' CSI-RS resource $P_1$ can be different from that for the second 'CLASS B' CSI-RS resources $P_2$ where $P_1 \geq P_2$. As specified, a UE performs aperiodic CSI reporting using the PUSCH in subframe n+k on serving cell c, upon decoding in subframe n either an uplink DCI format, or a Random Access Response Grant, for serving cell c if the respective CSI request field is set to trigger a report and is not reserved.

In this third embodiment, a UE performs an A-CSI reporting of a type associated with eMIMO-Type of 'CLASS A' ('nonPrecoded') if the respective CSI request field is set to trigger a CSI report associated with this eMIMO-Type of 'CLASS A' ('nonPrecoded'). Else, a UE performs an A-CSI reporting of a type associated with eMIMO-Type of 'CLASS B' ('beamformed') if the respective CSI request field is set to trigger a CSI report associated with this eMIMO-Type of 'CLASS B' ('beamformed'). In this embodiment, the number of bits for CSI request field can be increased by 1 bit to facilitate triggering of CSI reports for these two eMIMO-Types. Alternatively, a third hypothesis can be added on the above two hypotheses. That is, a UE performs an A-CSI reporting which includes CSI associated with both eMIMO-Type of 'CLASS A' ('nonPrecoded') and eMIMO-Type of 'CLASS B' ('beamformed') if the respective CSI request field is set to trigger a CSI report associated with both eMIMO-Types.

Alternatively, instead of increasing the number of bits for CSI request field, a separate one or two-bit CSI request parameter can be introduced for the purpose of triggering an A-CSI report associated with one of the two or three eMIMO-Type hypotheses above.

Analogous to the first embodiment, two sub-embodiments apply depending on the number of CSI processes associated with these two eMIMO-Types.

A first sub-embodiment is to associate both a first CSI-RS resource (or CSI-RS resource configuration, hence eMIMO-Type of 'CLASS A'/'nonPrecoded') and a second CSI-RS resource (or CSI-RS resource configuration, hence eMIMO-Type of 'CLASS B'/'beamformed') with a single CSI process. Therefore, CSI reports and calculations associated with the two CSI-RS resources (or CSI-RS resource configurations) can be either dependent on or independent of each other—that is, the two CSI reports are associated with one CSI reporting configuration. In the present disclosure, several example schemes are described in TABLE 3 below. CSI content for each scheme is given. Depending on the configured CSI reporting mode, the reported CQI can be wideband (one CQI for each codeword calculated for the set S subbands) or subband (one CQI for each codeword for each subband in the set S subbands). Likewise, the reported second or single PMI $i_2$ can be wideband (one PMI calculated for the set S subbands) or subband (one PMI for each subband in the set S subbands). The first PMI $i_1$ is reported as a wideband (one PMI calculated for the set S subbands) PMI.

For the schemes described in this sub-embodiment, PMI $i_1$ denotes the PMI associated with the first index of a 'CLASS A' ('nonPrecoded') codebook. Depending on the codebook configuration, this first index $i_1$ can include one component or two components $\{i_{1,1}, i_{1,2}\}$. The other PMI $i_2$ can denote either the index of a codebook different from the 'CLASS A' ('nonPrecoded') codebook or the second index of a 'CLASS A' ('nonPrecoded') codebook.

In scheme 3.1, a UE reports only $i_1$ upon decoding in subframe n either an uplink DCI format, or a Random Access Response Grant containing a CSI request field which is set to trigger a CSI report associated with eMIMO-Type of 'CLASS A' ('nonPrecoded'). Else, a UE reports CQI, $i_2$, and RI upon decoding in subframe n either an uplink DCI format, or a Random Access Response Grant containing a CSI request field which is set to trigger a CSI report associated with eMIMO-Type of 'CLASS B' ('beamformed'). Here, $i_1$ is calculated conditioned upon the last reported RI. In this case, three possibilities exist: 1) the last reported periodic RI; 2) the RI reported from the last A-CSI report; 3) the last reported RI in the same CSI process.

In scheme 3.2, a UE reports $i_1$ and RI upon decoding in subframe n either an uplink DCI format, or a Random Access Response Grant containing a CSI request field which is set to trigger a CSI report associated with eMIMO-Type of 'CLASS A' ('nonPrecoded'). The first PMI $i_1$ is calculated conditioned on the reported RI in the same A-CSI report. Else, a UE reports CQI, $i_2$, and RI upon decoding in subframe n either an uplink DCI format, or a Random Access Response Grant containing a CSI request field which is set to trigger a CSI report associated with eMIMO-Type of 'CLASS B' ('beamformed'). The PMI $i_2$ and CQI are calculated conditioned on the reported RI in the same A-CSI report. The value of RI in the CSI report triggered for eMIMO-Type of 'CLASS A' ('nonPrecoded') can be the same (either calculated jointly or the second RI is restricted to be the same as the first RI) or different (calculated independently) from that in the CSI report triggered for eMIMO-Type of 'CLASS B' ('beamformed').

In scheme 3.3, a UE reports $i_1$ and RI upon decoding in subframe n either an uplink DCI format, or a Random Access Response Grant containing a CSI request field which is set to trigger a CSI report associated with eMIMO-Type of 'CLASS A' ('nonPrecoded'). Else, a UE reports CQI and $i_2$ upon decoding in subframe n either an uplink DCI format, or a Random Access Response Grant containing a CSI request field which is set to trigger a CSI report associated with eMIMO-Type of 'CLASS B' ('beamformed'). Here, CQI and $i_2$ are calculated conditioned upon the last reported RI. In this case, three possibilities exist: 1) the last reported periodic RI; 2) the RI reported from the last A-CSI report; 3) the last reported RI in the same CSI process.

TABLE 3

Schemes for the third embodiment (A-CSI with one CSI process), sub-embodiment 1

| Scheme | CSI content for A-CSI request indicating 'CLASS A' eMIMO-Type | CSI content for A-CSI request indicating 'CLASS B' eMIMO-Type |
|---|---|---|
| 3.1 | $i_1$ | CQI + $i_2$ + RI |
| 3.2 | $i_1$ + RI | CQI + $i_2$ + RI |
| 3.3 | $i_1$ + RI | CQI + $i_2$ |

A second sub-embodiment is to associate a first CSI-RS resource (or CSI-RS resource configuration) with a first CSI process and a second CSI-RS resource (or CSI-RS resource configuration) with a second CSI process. In this sub-embodiment, each CSI process (and hence CSI-RS resource or CSI-RS resource configuration) is assigned a CSI reporting configuration. Therefore, two sets of CSI calculations and reports associated with the two CSI process can be defined independently—that is, one set of CSI reports is not calculated assuming the other one.

The three schemes of the first sub-embodiment (TABLE 3) are also applicable to the second sub-embodiment and replicated below in TABLE 4. Depending on the configured CSI reporting mode, the reported CQI can be wideband (one CQI for each codeword calculated for the set S subbands) or subband (one CQI for each codeword for each subband in the set S subbands). Likewise, the reported second or single PMI $i_2$ can be wideband (one PMI calculated for the set S subbands) or subband (one PMI for each subband in the set S subbands). The first PMI $i_1$ is reported as a wideband (one PMI calculated for the set S subbands) PMI.

For the schemes described in this sub-embodiment, PMI $i_1$ denotes the PMI associated with the first index of a 'CLASS A' ('nonPrecoded') codebook. Depending on the codebook configuration, this first index $i_1$ can include one component or two components $\{i_{1,1}, i_{1,2}\}$. The other PMI $i_2$ can denote either the index of a codebook different from the 'CLASS A' ('nonPrecoded') codebook or the second index of a 'CLASS A' ('nonPrecoded') codebook.

For schemes 3.4 and 3.6 in this sub-embodiment, only one of the two configured CSI processes is configured with RI reporting. For this purpose, one of the two configured CSI processes is set as 'RI-reference CSI process'.

In scheme 3.4, a UE reports only $i_1$ upon decoding in subframe n either an uplink DCI format, or a Random Access Response Grant containing a CSI request field which is set to trigger a CSI report associated with eMIMO-Type of 'CLASS A' ('nonPrecoded'). Else, a UE reports CQI, $i_2$, and RI upon decoding in subframe n either an uplink DCI format, or a Random Access Response Grant containing a CSI request field which is set to trigger a CSI report associated with eMIMO-Type of 'CLASS B' ('beamformed'). The CSI process associated with 'CLASS B' ('beamformed') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the 'configured RI-reference CSI process' (in this case, the CSI process associated with the CSI process configured with 'CLASS B' ('beamformed') eMIMO-Type) in the most recent RI reporting instance for the CSI process.

In scheme 3.5, a UE reports $i_1$ and RI upon decoding in subframe n either an uplink DCI format, or a Random Access Response Grant containing a CSI request field which is set to trigger a CSI report associated with eMIMO-Type of 'CLASS A' ('nonPrecoded'). The first PMI $i_1$ is calculated conditioned on the reported RI in the same A-CSI report. Else, a UE reports CQI, $i_2$, and RI upon decoding in subframe n either an uplink DCI format, or a Random Access Response Grant containing a CSI request field which is set to trigger a CSI report associated with eMIMO-Type of 'CLASS B' ('beamformed'). The PMI $i_2$ and CQI are calculated conditioned on the reported RI in the same A-CSI report. The value of RI in the CSI report triggered for eMIMO-Type of 'CLASS A' ('nonPrecoded') can be the same (either calculated jointly or the second RI is restricted to be the same as the first RI) or different (calculated independently) from that in the CSI report triggered for eMIMO-Type of 'CLASS B' ('beamformed').

In scheme 3.6, a UE reports $i_1$ and RI upon decoding in subframe n either an uplink DCI format, or a Random Access Response Grant containing a CSI request field which is set to trigger a CSI report associated with eMIMO-Type of 'CLASS A' ('nonPrecoded'). Else, a UE reports CQI and $i_2$ upon decoding in subframe n either an uplink DCI format, or a Random Access Response Grant containing a CSI request field which is set to trigger a CSI report associated with eMIMO-Type of 'CLASS B' ('beamformed'). The CSI process associated with 'CLASS A' ('nonPrecoded') eMIMO-Type assigned as the 'RI-reference CSI process'. In this case, CQI and the PMI value $i_2$ associated with the CSI process configured with 'CLASS B' ('beamformed') eMIMO-Type as well as the PMI value $i_1$ associated with the CSI process configured with 'CLASS A' ('nonPrecoded') eMIMO-Type are calculated conditioned on the reported periodic RI for the 'configured 'RI-reference CSI process' (in this case, the CSI process associated with the CSI process configured with 'CLASS A' ('nonPrecoded') eMIMO-Type) in the most recent RI reporting instance for the CSI process.

TABLE 4

The third embodiment (A-CSI with two CSI processes), sub-embodiment 2

| Scheme | CSI content for A-CSI request indicating 'CLASS A' eMIMO-Type, CSI process 1 | CSI content for A-CSI request indicating 'CLASS B' eMIMO-Type, CSI process 2 |
| --- | --- | --- |
| 3.4 | $i_1$ | CQI + $i_2$ + RI |
| 3.5 | $i_1$ + RI | CQI + $i_2$ + RI |
| 3.6 | $i_1$ + RI | CQI + $i_2$ |

For both sub-embodiments of the first embodiment, the first PMI value $i_1$ associated with 'CLASS A' (nonPrecoded') eMIMO-Type can be replaced by a different type of feedback such as channel quantization feedback, quantized eigenvectors, or quantized channel covariance matrix. In such cases, the UE does not report the RI associated with 'CLASS A' (nonPrecoded') eMIMO-Type. Alternatively, RI can be reported but represents a channel characteristic such as channel rank or the number of eigenvalues or singular values which indicates the dimensionality of the channel or the number of channel vectors reported by the UE.

In a fourth embodiment is an aperiodic CSI (A-CSI) counterpart of the second embodiment. In this embodiment, a first set of K CSI-RS resources (or CSI-RS resource configurations) is associated with eMIMO-Type of 'CLASS B' ('beamformed') with K>1 CSI-RS resources (or CSI-RS resource configurations) and a second CSI-RS resource (or CSI-RS resource configuration) is associated with eMIMO-Type of 'CLASS B' ('beamformed') with one CSI-RS resource (or CSI-RS resource configuration). The total number of CSI-RS ports of the first set $P_1 = \Sigma_{i=1}^{K} P_{1,i}$ is greater than or equal to the number of CSI-RS ports of the second CSI-RS resource $P_2$.

Two sub-embodiments are possible for aperiodic CSI (A-CSI) reporting. In a first sub-embodiment, both the first set of K CSI-RS resources and the second CSI-RS resource can be associated with one CSI process. In a second sub-embodiment, the first set of K CSI-RS resources is associated with a first CSI process and the second CSI-RS resource with a second CSI process. In this fourth embodiment, a CSI reported associated with one or more CSI-RS resources (or CSI-RS resource configurations) out of a total of K CSI-RS resources associated with the first 'CLASS B' ('beamformed') eMIMO-Type setup can be triggered by a CSI request. A CSI reported associated with one CSI-RS resource (or CSI-RS resource configuration) associated with the second 'CLASS B' ('beamformed') eMIMO-Type setup can also be triggered by a CSI request. Two possibilities exist. In a first possibility, a UE is not requested to report an A-CSI including both CSI for one or more CSI-RS resources from the first 'CLASS B' ('beamformed') eMIMO-Type setup and CSI for the second 'CLASS B' ('beamformed') eMIMO-Type setup. In a second possibility, an A-CSI reported by a UE can include both CSI for one or more CSI-RS resources from the first 'CLASS B' ('beamformed') eMIMO-Type setup and CSI for the second 'CLASS B' ('beamformed') eMIMO-Type setup.

In either of the above two possibilities, UE performs aperiodic CSI reporting using the PUSCH in subframe n+k on serving cell c, upon decoding in subframe n either an uplink DCI format, or a Random Access Response Grant, for serving cell c if the respective CSI request field is set to trigger a report and is not reserved. Therefore, a UE performs an A-CSI reporting of a type associated with one or more CSI-RS resources (or CSI-RS resource configurations) out of a total of K CSI-RS resources associated with the first eMIMO-Type of 'CLASS B' ('beamformed') if the respective CSI request field is set to trigger a CSI report associated with this first eMIMO-Type of 'CLASS B' ('beamformed'). Else, a UE performs an A-CSI reporting of a type associated with the second eMIMO-Type of 'CLASS B' ('beamformed') if the respective CSI request field is set to trigger a CSI report associated with this eMIMO-Type of 'CLASS B' ('beamformed').

For this embodiment, the number of bits for CSI request field can be increased to facilitate triggering of CSI reports not only for these two eMIMO-Type setups (the first 'CLASS B' with K CSI-RS resources and the second 'CLASS B' with 1 CSI-RS resource), but also for triggering one or more CSI-RS resources (or CSI-RS resource configurations) out of a total of K CSI-RS resources associated with the first eMIMO-Type of 'CLASS B' ('beamformed'). For example, the number of bits for CSI request field can be increased by $N_T$ bits which indicates CSI request/trigger for a subset of K CSI-RS resources of the first 'CLASS B' or the second 'CLASS B'. Alternatively, instead of increasing the number of bits for CSI request field, a separate $N_T$-bit CSI request parameter can be introduced for the purpose of triggering an A-CSI report described above.

When only CSI process is used for both eMIMO-Type settings just as in the first sub-embodiment of the third embodiment, an additional higher layer (RRC) signaling can be introduced to indicate a function of a 'CLASS B' ('beamformed') eMIMO-Type. This function can correspond to CSI reporting such as the content of one CSI report. For example, for the first 'CLASS B' ('beamformed') eMIMO-Type with K CSI-RS resources (or resource configurations), a CSI report can include a set of K CSI reports, each corresponding to one of the K CSI-RS resources (or resource configurations) and each CSI report can include RI, CQI, and PMI derived from a particular choice of codebook. Since this set of K CSI reports can be used by the eNB to estimate CSI for $P_1$-port CSI-RS, these CSI reports can correspond to a same value of RI. For the second 'CLASS B' ('beamformed') eMIMO-Type with one CSI-RS resource (or resource configuration), its corresponding CSI report can include RI, CQI, and PMI derived from a particular choice of codebook which can be the same as or different from the first choice of codebook. Therefore, this embodiment can be implemented with including a codebook selection parameter for each CSI-RS resource or resource configuration (in this case, each of the K+1 CSI-RS resources of resource configurations). This resource- or resource-configuration-specific codebook selection RRC parameter (termed, for example, CBSelect_CSI-RS_Resource) can be introduced in an NZP CSI-RS resource configuration information element (IE).

When two CSI processes are used (one for the first 'CLASS B' eMIMO-Type with K CSI-RS resources, another for the second 'CLASS B' eMIMO-Type with 1 CSI-RS resources) just as in the second sub-embodiment of the third embodiment, a codebook selection indicator can be introduced for each of the two CSI processes.

In a variation of this fourth embodiment, when CRI is reported by the UE for the first set of K CSI-RS resources (associated with eMIMO-Type of 'CLASS B' ('beamformed') with K>1 CSI-RS resources (or CSI-RS resource configurations)), instead of reporting K CSI reports (each associated with one of the K CSI-RS resources), the UE reports only one CSI containing only CRI (without CQI, without PMI, and without RI). This CRI indicates a recommended selection of one out of K CSI-RS resources. For the second set of one CSI-RS resource (associated with eMIMO-Type of 'CLASS B' ('beamformed') with one CSI-RS resource (or CSI-RS resource configuration)), the UE reports one CSI containing CQI, PMI, and RI based on a codebook for $P_2$-port CSI-RS. This CSI calculation is conditioned on the last reported CRI associated with the first CSI process with K CSI-RS resources.

In yet another variation of this fourth embodiment, a first set of K=2 CSI-RS resources (or CSI-RS resource configurations) is associated with eMIMO-Type of 'CLASS B' ('beamformed') with K=2 CSI-RS resources (or CSI-RS resource configurations) and a second CSI-RS resource (or CSI-RS resource configuration) is associated with eMIMO-Type of 'CLASS B' ('beamformed') with one CSI-RS resource (or CSI-RS resource configuration). For the first set of K=2 CSI-RS resources (the first CSI-RS resource with $P_{1,1}$ ports and the second CSI-RS resource with $P_{1,2}$ ports), just as in the first embodiment, the UE can be configured to report only some of the CSI parameters. For example, for the first $P_{1,1}$-port CSI-RS, the UE can report either RI+$i_{1,1}$ only or $i_{1,1}$ only. For the second $P_{1,2}$-port CSI-RS, the UE can report either RI+$i_{1,2}$ only or $i_{1,2}$ only. Either one of the two CSI reports or both CSI reports can be reported with or without RI. If only one of the two CSI reports (labelled as CSI report A) contains an RI, the other CSI report (termed CSI report B) associated with the other CSI-RS resource is calculated conditioned on the RI from CSI report A. If each of the two CSI reports contains an RI, the two values of RI can be determined independently or set the same (for example, by setting one of CSI-RS resources as a reference for RI reporting). For the second set of one CSI-RS resource (associated with eMIMO-Type of 'CLASS B' ('beamformed') with one CSI-RS resource (or CSI-RS resource configuration)), the UE reports one CSI containing CQI, PMI, and RI based on a codebook for $P_2$-port CSI-RS. Alternatively, if RI is already reported for the first set of K=2 CSI-RS resources, only CQI+PMI can be reported for this $P_2$-port CSI-RS. In this case, CQI and PMI are calculated conditioned on the last reported RI associated with the first CSI process with K=2 CSI-RS resources (associated with eMIMO-Type of 'CLASS B' ('beamformed') with K=2 CSI-RS resources (or CSI-RS resource configurations)). In this case, the first CSI process can be configured as the RI reference process.

For calculating $i_{1,1}$ and $i_{1,2}$, a two-dimensional codebook such as a codebook used for 'CLASS A' eMIMO-Type can be used where the codebook parameters ($N_1$, $N_2$) are set to either ($P_{1,1}$, $P_{1,2}$) or ($P_{1,1}/2$, $P_{1,2}$), respectively. This implies that $i_{1,1}$ and $i_{1,2}$ are intended to represent two components of first PMI $i_1$ associated with $2P_{1,1}P_{1,2}$ or $P_{1,1}P_{1,2}$ CSI-RS ports. In this case, the calculation of $i_{1,1}$ and $i_{1,2}$ can be either independent or dependent on each other. For instance, $i_{1,2}$ is calculated conditioned on the reported $i_{1,1}$, or vice versa.

Alternatively, $i_{1,1}$ can be calculated using a $P_{1,1}$-port codebook while $i_{1,2}$ can be calculated using a $P_{1,2}$-port codebook. Likewise, the calculation of $i_{1,1}$ and $i_{1,2}$ can be either independent or dependent on each other. For instance, $i_{1,2}$ is calculated conditioned on the reported $i_{1,1}$, or vice versa. When more than one choices of codebook are available for a given number of CSI-RS ports (for each of the two PMI components), a codebook selection parameter for each CSI-RS resource or resource configuration (in this case, each of the two CSI-RS resources of resource configurations). This resource- or resource-configuration-specific codebook selection RRC parameter (termed, for example, CBSelect_CSI-RS_Resource) can be introduced in an NZP CSI-RS resource configuration information element (IE).

In a fifth embodiment, with configurable one CSI process with two eMIMO-Types, a UE can be configured with one CSI process which is configured with two eMIMO-Types where both a first CSI-RS resource (or CSI-RS resource configuration) and a second CSI-RS resource (or CSI-RS resource configuration) are associated with this single CSI process. Each of the two eMIMO-Types can be configured separately as either 'CLASS A'/'nonPrecoded' or 'CLASS B'/'beamformed'. When one of these two eMIMO-Types is assigned as 'CLASS B'/'beamformed', it can be associated with one or a plurality of CSI-RS resources (or CSI-RS resource configurations). Alternatively, any of the two eMIMO-Types can be configured with a new type such as 'CLASS C' or 'CLASS D'. For this embodiment, for each of the two eMIMO-Types, CQI reporting can be enabled or disabled via higher-layer signaling using an RRC parameter (for example, CQIReportingEnabled) Likewise, RI reporting can be enabled or disabled via higher-layer signaling using an RRC parameter (for example, RIReportingEnabled). Likewise, for an eMIMO-Type where two PMI values ($i_1$ and $i_2$) are reported, each of the two PMI values can be enabled or disabled via higher-layer signaling using an RRC parameter (for example, i1ReportingEnabled and i2ReportingEnabled). When the first PMI value $i_1$ includes two components ($i_{1,1}$ and $i_{1,2}$), each of these two PMI components can be enabled or disabled via higher-layer signaling using an RRC parameter (for example, i11ReportingEnabled and i12ReportingEnabled). For an eMIMO-Type where one PMI value (i) are reported, the PMI value can be enabled or disabled via higher-layer signaling using an RRC parameter (for example, PMIReportingEnabled). In addition, any combination of these configurations can be used. This embodiment entails full configurability.

In another alternative embodiment, only partial configurability is supported. For example, only the CSI parameters associated with one of the two eMIMO-Types can be enabled or disabled via higher-layer signaling using a single or separate RRC parameters.

Or only one or some of the CSI parameters associated with one of the two eMIMO-Types can be enabled or disabled via higher-layer signaling using a single RRC parameter (that is, one RRC parameter disabling or enabling the pertinent RRC parameters) or separate RRC parameters. As an example, when the first eMIMO-Type is set to be 'CLASS A'/'nonPrecoded', CQI, RI, and/or $i_2$ can be enabled or disabled using a single RRC parameter (that is, one RRC parameter disabling or enabling the three parameters) or separate RRC parameters (either three separate RRC parameters each enabling/disabling one CSI parameter, or one RRC parameter for enabling/disabling CQI and $i_2$ while the other RRC parameter for enabling/disabling RI). In this case, $i_1$ (which can include either one index or two components ($i_{1,1}$ and $i_{1,2}$)) reporting is performed for the first eMIMO-Type. Or, when the first eMIMO-Type is set to be 'CLASS A'/'nonPrecoded', CQI and/or $i_2$ can be enabled or disabled using a single RRC parameter (that is, one RRC parameter disabling or enabling the two parameters) or two separate RRC parameters (two RRC parameters, one RRC parameter for enabling/disabling CQI while the other RRC parameter for enabling/disabling $i_2$). In this case, RI and $i_1$ (which can include either one index or two components ($i_{1,1}$ and $i_{1,2}$)) reporting are performed for the first eMIMO-Type. In addition, any combination of these configurations can be used.

In a sixth embodiment, with configurable two CSI processes with two eMIMO-Types, a UE can be configured with two CSI processes where each CSI process is associated with one eMIMO-Type. Furthermore, a first CSI-RS resource (or CSI-RS resource configuration) and a second CSI-RS resource (or CSI-RS resource configuration) are associated with the first and the second CSI process, respectively. Each of the two eMIMO-Types can be configured separately as either 'CLASS A'/'nonPrecoded' or 'CLASS B'/'beamformed'. When one of these two eMIMO-Types is assigned as 'CLASS B'/'beamformed', it can be associated with one or a plurality of CSI-RS resources (or CSI-RS resource configurations). Alternatively, any of the two eMIMO-Types can be configured with a new type such as 'CLASS C' or 'CLASS D'.

For this embodiment, for each of the two eMIMO-Types, CQI reporting can be enabled or disabled via higher-layer signaling using an RRC parameter (for example, CQIReportingEnabled). Likewise, RI reporting can be enabled or disabled via higher-layer signaling using an RRC parameter (for example, RIReportingEnabled) Likewise, for an eMIMO-Type where two PMI values ($i_1$ and $i_2$) are reported, each of the two PMI values can be enabled or disabled via higher-layer signaling using an RRC parameter (for example, i1ReportingEnabled and i2ReportingEnabled). When the first PMI value $i_1$ includes two components ($i_{1,1}$ and $i_{1,2}$), each of these two PMI components can be enabled or disabled via higher-layer signaling using an RRC parameter (for example, i11ReportingEnabled and i12ReportingEnabled). For an eMIMO-Type where one PMI value (i) are reported, the PMI value can be enabled or disabled via higher-layer signaling using an RRC parameter (for example, PMIReportingEnabled). This embodiment entails full configurability.

In another alternative embodiment, only partial configurability is supported. For example, only the CSI parameters associated with one of the two eMIMO-Types can be enabled or disabled via higher-layer signaling using a single or separate RRC parameters.

Or only one or some of the CSI parameters associated with one of the two eMIMO-Types can be enabled or disabled via higher-layer signaling using a single RRC parameter (that is, one RRC parameter disabling or enabling the pertinent RRC parameters) or separate RRC parameters. As an example, when the first eMIMO-Type is set to be 'CLASS A'/'nonPrecoded', CQI, RI, and/or $i_2$ can be enabled or disabled using a single RRC parameter (that is, one RRC parameter disabling or enabling the three parameters) or separate RRC parameters (either three separate RRC parameters each enabling/disabling one CSI parameter, or one RRC parameter for enabling/disabling CQI and $i_2$ while the other RRC parameter for enabling/disabling RI). In this case, $i_1$ (which can include either one index or two components ($i_{1,1}$ and $i_{1,2}$)) reporting is performed for the first eMIMO-Type. Or, when the first eMIMO-Type is set to be 'CLASS A'/'nonPrecoded', CQI and/or $i_2$ can be enabled or disabled using a single RRC parameter (that is, one RRC parameter disabling or enabling the two parameters) or two separate RRC parameters (two RRC parameters, one RRC parameter for enabling/disabling CQI while the other RRC parameter for enabling/disabling $i_2$). In this case, RI and $i_1$ (which can include either one index or two components ($i_{1,1}$ and $i_{1,2}$)) reporting are performed for the first eMIMO-Type. In addition, any combination of these configurations can be used.

In a seventh embodiment, dedicated CSI-RS resource for RI reporting, analogous to the first and the second embodiments where at least one periodic RI is reported in a separate set of subframes from the other CSI parameters, another (dedicated) CSI-RS resource or resource configuration can be allocated for a UE for RI calculation. This CSI-RS resource can be configured with lower time and/or frequency resolution. This CSI-RS resource can be associated with another (dedicated) CSI process or a same CSI process as one of the other CSI parameters.

For the second component of the present disclosure (that is, codebook design), for the above schemes of the sub-embodiments of the first and the third embodiments where the first eMIMO-Type is 'CLASS A'/'nonPrecoded', the second eMIMO-Type is 'CLASS B'/'beamformed' with one CSI-RS resource (or resource configuration), and $i_1$ (the first PMI value, which can include $i_{1,1}$ and $i_{1,2}$) is reported as a part of the CSI report associated with 'CLASS A'/'nonPrecoded' eMIMO-Type, a codebook or codebooks can be used to define the first PMI value $i_1$. Several alternatives of the codebook or codebooks for the first PMI value $i_1$ associated with 'CLASS A'/'nonPrecoded' eMIMO-Type are given as follows.

A first alternative is to use the codebooks associated with the RI values supported by a UE. For example, if a UE is capable of receiving and decoding up to 8-layer DL transmission, the codebooks associated with RI∈{1,2,3,4,5,6,7,8} are applicable. Codebook subset restriction can additionally be applied to configure the UE to calculate CSI only based on a subset of the applicable RI values. In this case, the first PMI value $i_1$ can be calculated conditioned on the last reported RI associated with either the first eMIMO-Type (if RI reporting is performed or configured for the first eMIMO-Type) or the second eMIMO-Type (if RI reporting is performed or configured only for the second eMIMO-Type). For P-CSI, this corresponds to the last reported periodic RI. For A-CSI, this corresponds to the RI reported together with the other (triggered/requested) CSI parameters.

Some more examples are as follows. In a first example, if $RI^{(1)}$ reporting is performed or configured only for the first eMIMO-Type, then the first PMI, the second PMI, and CQI correspond to the reported $RI^{(1)}$ in the first eMIMO-Type. In a second example, if $RI^{(2)}$ reporting is performed or configured only for the second eMIMO-Type, then the first PMI, the second PMI, and CQI correspond to the reported $RI^{(2)}$ in the second eMIMO-Type. In a third example, if $RI^{(1)}$ and $RI^{(2)}$ reporting are performed or configured for both the first and the second eMIMO-Types, then the second PMI, and CQI correspond to the rank ($RI^{(2)}$) according to one of the following alternatives. Alt 0: $I^{(1)}=RI^{(2)}$; Alt 1: $RI^{(2)} \in [RI^{(1)}-a, RI^{(1)}+b]$ where (a, b)=(0,1) if RI is odd and (a, b)=(1,0) otherwise; and Alt 2: $1 \leq RI^{(2)} \leq RI^{(1)}$.

The above first codebook alternative is applicable to the schemes of the sub-embodiments of the first and the third embodiments.

A second alternative is to use the codebook(s) associated with only one RI value. For example, only codebook(s) associated with RI=1 are used for CSI calculation associated with the first eMIMO-Type. In such cases, RI reporting is not needed for the first eMIMO-Type. For the first eMIMO-Type, the UE calculates first PMI value $i_1$ conditioned on RI=1 (conditioned on transmission rank one). This second codebook alternative is applicable to the following schemes of the sub-embodiments of the first and the third embodiments: Schemes 2 or 3 of sub-embodiment 1 of embodiment 1; Schemes 2B or 3B of sub-embodiment 2 of embodiment 1; Schemes 3.1 of sub-embodiment 1 of embodiment 3; Schemes 3.4 of sub-embodiment 2 of embodiment 3.

A third alternative is to use the codebooks associated with a subset of the RI values supported by a UE. For example, if a UE is capable of receiving and decoding up to 8-layer DL transmission, only the codebooks associated with RI∈{1,3,5,7} are applicable. Or if a UE is capable of receiving and decoding up to 8-layer DL transmission, only the codebooks associated with RI∈{1,3} are applicable. Or if a UE is capable of receiving and decoding up to 8-layer DL transmission, only the codebooks associated with RI∈{1,5} are applicable. Or if a UE is capable of receiving and decoding up to 8-layer DL transmission, only the codebooks associated with RI∈{3,7} are applicable. Or if a UE is capable of receiving and decoding up to 8-layer DL transmission, only the codebooks associated with RI∈{1,7} are applicable. In another example, if a UE is capable of receiving and decoding up to 4-layer DL transmission, only the codebooks associated with RI∈{1,3} are applicable. Or if a UE is capable of receiving and decoding up to 4-layer DL transmission, only the codebooks associated with RI∈{1} are applicable. Or if a UE is capable of receiving and decoding up to 4-layer DL transmission, only the codebooks associated with RI∈{3} are applicable. In another example, if a UE is capable of receiving and decoding up to 2-layer DL transmission, only the codebooks associated with RI∈{1} (reduced to the second alternative) are applicable. These examples are motivated by the redundancies in the set of first-stage precoders (associated with the first PMI value $i_1$) between RI=1 and 2 (at most 1 orthogonal beam within a group of beams), RI=3 and 4 (at most 2 orthogonal beams within a group of beams), RI=5 and 6 (at most 3 orthogonal beams within a group of beams), as well as RI=7 and 8 (at most 4 orthogonal beams within a group of beams). By removing such redundancies, the number of bits required for RI reporting of the first eMIMO-Type can be reduced by one bit. Or if the number of RI bits is unchanged, RI decoding performance at the eNB can be improved.

For this third alternative, therefore, an RI report is interpreted based on the set of rank-specific applicable codebooks. For example, if a UE is capable of receiving and decoding up to 8-layer DL transmission and the codebooks associated with RI∈{1,3,5,7} are applicable, a two-bit RI report can be used. In this case, when the decimal equivalent of the bit sequence associated with the last (most recent) RI report is 0, the reported first PMI component $i_1$ refers to a codebook associated with rank-1 or 1-layer. When the decimal equivalent of the bit sequence associated with the last (most recent) RI report is 1, the reported first PMI component $i_1$ refers to a codebook associated with rank-3 or 3-layer. When the decimal equivalent of the bit sequence associated with the last (most recent) RI report is 2, the reported first PMI component $i_1$ refers to a codebook associated with rank-5 or 5-layer. When the decimal equivalent of the bit sequence associated with the last (most recent) RI report is 3, the reported first PMI component $i_1$ refers to a codebook associated with rank-7 or 7-layer. Or if a UE is capable of receiving and decoding up to 8-layer DL transmission and the codebooks associated with RI∈{1,3} are applicable, a one-bit RI report can be used. In this case, when the decimal equivalent of the bit sequence associated with the last (most recent) RI report is 0, the reported first PMI component $i_1$ refers to a codebook associated with rank-1 or 1-layer. When the decimal equivalent of the bit sequence associated with the last (most recent) RI report is 1, the reported first PMI component $i_1$ refers to a codebook associated with rank-3 or 3-layer.

The above third codebook alternative is especially applicable to the following schemes of the sub-embodiments of the first and the third embodiments where the UE is configured with RI reporting for both the first and the second eMIMO-Type: Schemes 5, 6, or 7 of sub-embodiment 2 of embodiment 1; Schemes 5B, 6B, or 7B of sub-embodiment 3 of embodiment 1; Schemes 3.2 of sub-embodiment 1 of embodiment 3; Schemes 3.5 of sub-embodiment 2 of embodiment 3.

All the above embodiments pertain to the utilization of two eMIMO-Type settings. The following embodiments pertain to the utilization of multiple eMIMO-Type settings for supporting transmissions with large number of antenna elements. This can be done via CSI-RS "subsampling" implemented via multiple CSI-RS resources per CSI process with some additional signaling supports.

As the maximum number of CSI-RS ports is increased, for instance in case of NP CSI-RS, the amount of overhead for CSI-RS becomes excessive. With the current LTE specification, the maximum number of REs per PRB which can be allocated for CSI-RS is 40. If the CSI-RS ports are transmitted within one PRB and one subframe (implying 1

RE/PRB CSI-RS density), only 40 antenna ports can be supported. To support more than 40 ports and, at the same time, reduce the amount of CSI-RS overhead, subsampling in time, frequency, and/or beam (antenna port) domains can be used. But introducing CSI-RS subsampling in the current specification can prove inefficient and challenging.

Therefore, there is a need to introduce a support for more than 40 antenna ports in a manner compatible with the current Rel.13 LTE specification.

For the above purposes, embodiments of the present disclosure includes at least two components. The first component pertains to the use of a plurality of CSI-RS resources per CSI process to support CSI-RS subsampling. The second component pertains to DL and UL signaling support.

For the first component, to support a large number of CSI-RS ports with subsampling (time, frequency, and/or spatial domains) in a given CSI process, a plurality of K non-zero-power (NZP) CSI-RS resource per CSI process are configured by an eNB for a UE. Each of the K CSI-RS resources is used for a subset of CSI-RS entities (whether in time, frequency, or spatial/port domains). At least four embodiments exist.

In a first embodiment (termed the time-port scheme), an eNB configures a UE with K CSI-RS resources wherein for a given CSI-RS-carrying subframe, only a subset of possible CSI-RS antenna ports is measured by the UE. This subset of antenna ports is associated with only one of the K CSI-RS resources. Alternatively, a few CSI-RS resources (for example, K'<K resources) can also be used. This first embodiment can be illustrated in FIG. 7A wherein a UE is configured with one CSI process 701 which includes K=4 NZP CSI-RS resources (701, 702, 703, and 704). In this example embodiment, each CSI-RS resource is assigned a distinct subframe offset and associated with a size-8 subset of the possible 32 ports (712, 713, 714, and 715, respectively). That is, $N_1=N_2=N_3=N_4=8$ in this case. While the choice of subset can be transparent to the UE, the UE knows which of the 4 CSI-RS resources it measures at a given subframe based on the CSI-RS resource configuration information. As the UE measures the k-th (k=1, 2, 3, 4) 8-port CSI-RS resource, it calculates and reports CSI. Two possible UE behaviors for CSI calculation and reporting can be perceived. First, the UE calculates and reports an 8-port CSI associated with only the k-th CSI-RS resource. In this behavior, four disjoint 8-port CSI calculations and reports are made. The UE assumes an 8-port codebook for each CSI-RS resource. Second, the UE calculates and reports a 32-port CSI associated with the most recent k-th CSI-RS resource along with the previously measured k'-th CSI-RS where k≠k'. In this case, the UE combines at least the 4 most recent CSI-RS measurements and CSI calculations to generate a 32-port CSI reports. The UE assumes a 32-port codebook for the composite 32-port CSI-RS (composed from aggregating four CSI-RS resources). For either UE behavior, the index of CSI-RS resource can either be explicitly reported by the UE (via an UL control channel either as a separate UCI parameter or a part of CSI reporting) or implicitly inferred from CSI-RS resource configuration info available at the eNB.

For this embodiment, K CSI-RS resources are used to cover the possible CSI-RS ports. If there is no overlap between two CSI-RS resources (that is, the two CSI-RS resource configurations share at least one common CSI-RS port number/index), the total number of distinct CSI-RS ports that can be supported is $\Sigma_{k=1}^{K}N_k$. Alternatively, overlap among some of the port number(s) across at least two of K CSI-RS resources can be configured as well. For example, one CSI-RS resource can be configured with port numbers {15, 16, 17, 18, 19, 20, 21, 23} while another with {15, 17, 19, 21, 23, 25, 27, 29}.

Alternatively, for 2D rectangular antenna port arrays, K=2 CSI-RS resources associated with vertical and horizontal dimensions can be configured for a UE. The UE measures these two CSI-RS resources and reports two CSIs, one for the horizontal dimension, the other one for the vertical dimension. The eNB can approximate the CSI associated with the 2D port array by taking the Kronecker product of the first CSI (or its component) and the second CSI (or its component). This embodiment is described in FIG. 7B wherein a UE is configured with one CSI process 751 which includes K=2 NZP CSI-RS resources (751 and 752). In this example, each CSI-RS resource is assigned a distinct subframe offset and associated with a size-8 subset for each of the two dimensions (762 and 763, respectively). Each of these two CSI-RS resources is associated with a one-dimensional dual-polarized linear port array. That is, $N_1=N_2=8$ but $N_1+N_2=16$ is less than the total number of distinct CSI-RS ports (=32).

Figure 7A:
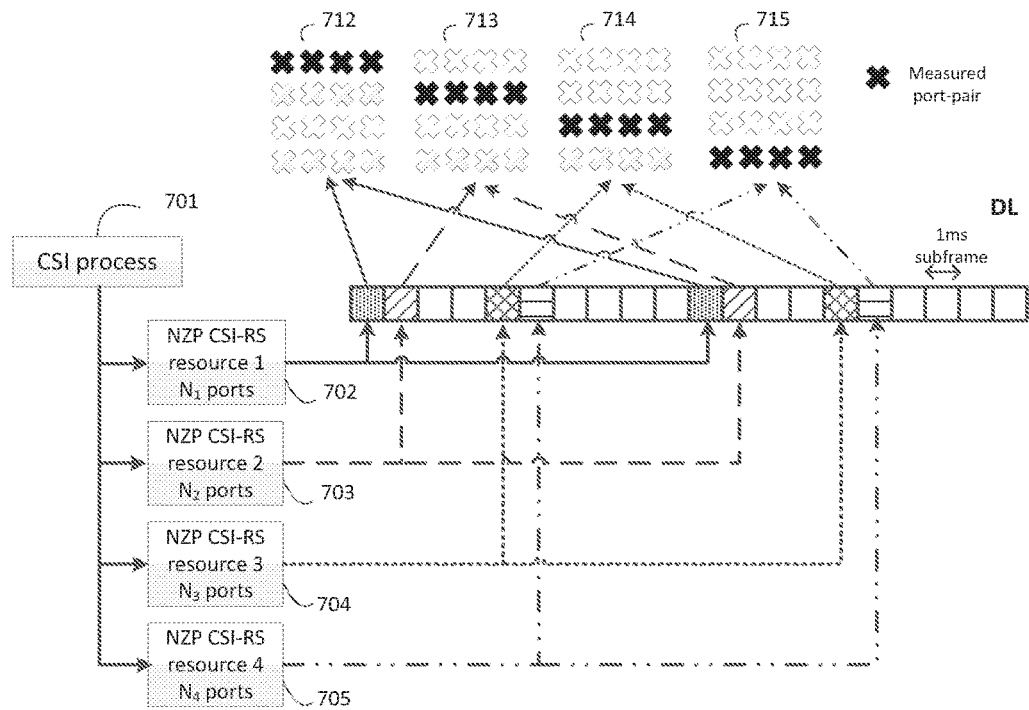
FIG. 7A illustrates an example of CSI-RS sub-sampling where CSI-RS ports are partitioned into multiple port subsets according to an embodiment of the present disclosure.
Figure 7B:
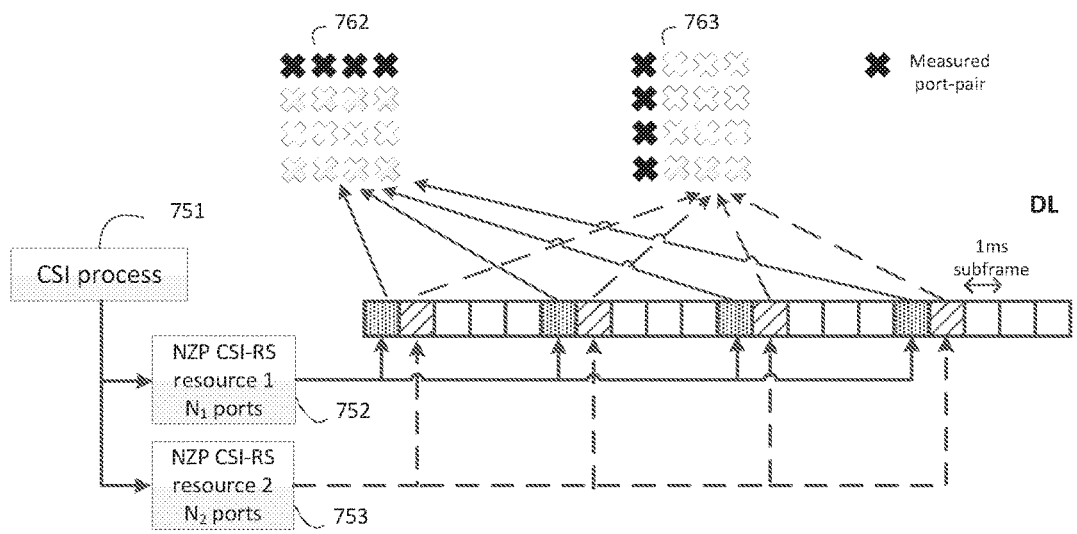
FIG. 7B illustrates an example of CSI-RS sub-sampling where a horizontal and a vertical port subset are used according to an embodiment of the present disclosure.
Figure 7C:
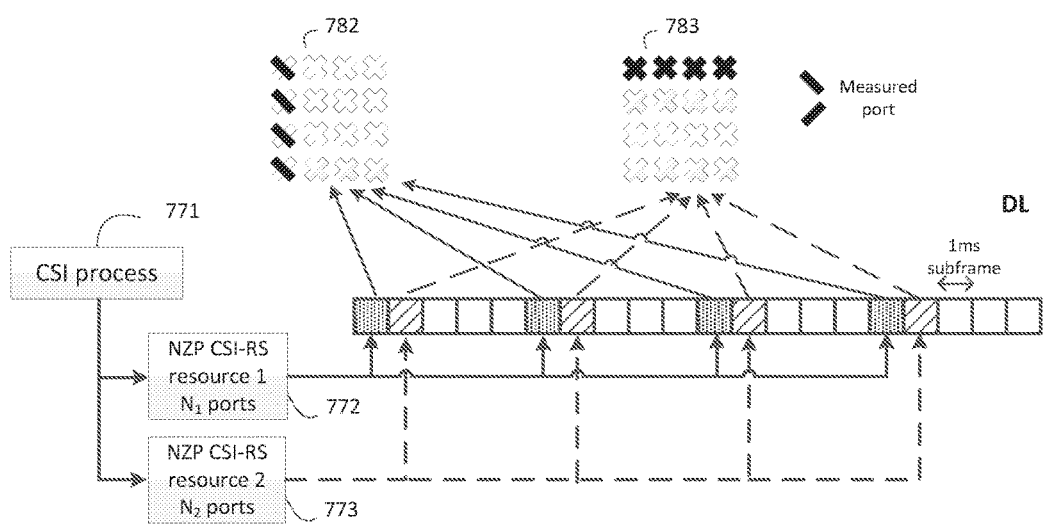
FIG. 7C illustrates an example of CSI-RS sub-sampling where a horizontal and a vertical port subset are used according to an embodiment of the present disclosure.

Alternatively, as illustrated in FIG. 7C, one of these two CSI-RS resources can be associated with a one-dimensional single-polarized linear port array. That is, $N_1=4$, $N_2=8$ or $N_1=8$, $N_2=4$ but $N_1+N_2=12$ is less than the total number of distinct CSI-RS ports (=32). In this embodiment, a UE is configured with one CSI process 771 which includes K=2 NZP CSI-RS resources (772 and 773). In this example, each CSI-RS resource is assigned a distinct subframe offset and associated with a size-8 subset for each of the two dimensions (782 and 783, respectively). Analogous to the previous embodiment, two possible UE behaviors can be perceived. First, the UE calculates and reports an $N_k$-port CSI associated with only the k-th CSI-RS resource. In this behavior, two disjoint $N_k$-port CSI calculations and reports are made. Second, the UE calculates and reports a 32-port CSI associated with the most recent k-th CSI-RS resource along with the previously measured k'-th CSI-RS where k≠k'. In this case, the UE combines at least the 2 most recent CSI-RS measurements and CSI calculations to generate a 32-port CSI reports. For either UE behavior, the index of CSI-RS resource can either be explicitly reported by the UE (via an UL control channel either as a separate UCI parameter or a part of CSI reporting) or implicitly inferred from CSI-RS resource configuration info available at the eNB. In the example embodiments illustrated in FIGS. 7B and 7C, some overlap in the configured port numbers can occur between the two configured CSI-RS resources.

In a second embodiment (termed the time-frequency scheme), an eNB configures a UE with K CSI-RS resources wherein for a given CSI-RS-carrying subframe, possible CSI-RS antenna ports are measured by the UE. But within each of the CSI-RS-carrying subframes, only a subset of possible CSI-RS REs in frequency domain is measured. One subset of REs is associated with only one of the K CSI-RS resources. Alternatively, a few CSI-RS resources (for example, K'<K resources) can also be used.

In a third embodiment (termed the frequency-port scheme), an eNB configures a UE with K CSI-RS resources wherein for a given CSI-RS-carrying subframe, possible CSI-RS antenna ports are measured by the UE. But within a given PRB or PRB group, only a subset of CSI-RS antenna ports is measured within a given PRB or PRB group (or in general, a set of REs). One subset of CSI-RS antenna ports in a given PRB or PRB group is associated with only one of the K CSI-RS resources. Alternatively, a few CSI-RS resources (for example, K'<K resources) can also be used.

A fourth embodiment (termed the time-frequency-port scheme) is a combination of the previous three embodiments. Here, an eNB configures a UE with K CSI-RS resources wherein for a given CSI-RS-carrying subframe, possible CSI-RS antenna ports are measured by the UE. But within each of the CSI-RS-carrying subframes and a given PRB or PRB group, only a subset of CSI-RS antenna ports is measured. This subset of CSI-RS antenna ports and REs are associated with only one of the K CSI-RS resources. Alternatively, a few CSI-RS resources (for example, K'<K resources) can also be used.

For the second component, to facilitate the above CSI-RS subsampling based on configuring a UE with a plurality of (K) CSI-RS resources, some DL and/or UL signaling support need to be introduced. Several alternative embodiments are possible.

In a first embodiment, an eNB can configure a UE to report a CSI for each of the K configured CSI-RS resources via a DL signaling either semi-statically (via RRC signaling—embodiment 1A) or dynamically (via L1 control channel—embodiment 1B). An example of semi-static signaling is an RRC parameter which configures the UE to measure each of the K CSI-RS resources according to a predetermined pattern (such as a simple consecutive pattern/sequence {0, 1, . . . , K−1}) and consecutively reports a CSI for each of the K CSI-RS resources. This parameter can be a flag which takes value from {TRUE, FALSE}. When this parameter is TRUE, the UE calculates and reports a CSI as the UE measures each of the K CSI-RS resources consecutively (according to the predetermined pattern). That is, as the UE measures the k-th CSI-RS resource, the UE reports a k-th CSI associated with this CSI-RS resource. This example applies especially for periodic CSI reporting. An example of dynamic signaling is to utilize an UL grant to request/trigger CSI report. In this case, the associated CSI request field includes a requested CSI-RS resource index or set of CSI-RS resource indices. Along with CSI-RS resource configuration information, the UE measures the CSI-RS resource indicated in the CSI request field of the UL grant and reports its associated CSI.

In a second embodiment (embodiment 2), an eNB can configure a UE to report a CSI for each of the K configured CSI-RS resources via a DL signaling semi-statically (via RRC signaling). Instead of utilizing DL signaling to indicate a CSI-RS resource index to be measured by the UE, the eNB can utilize an RRC parameter (a flag) which takes value from {TRUE, FALSE}. When this parameter is TRUE, the UE calculates and reports a CSI as the UE measures a CSI-RS resource of its choice. This CSI report includes CRI (CSI-RS resource indicator) which points to the measured CSI-RS resource. In this case, the UE can cycle across the K configured CSI-RS resources (or a subset of the K configured CSI-RS resources thereof) and report CSI for each of those resources. The corresponding CSI-RS resource for a given CSI reporting instance is indicated by the last reported periodic CRI (for periodic CSI reporting) or the reported CRI within the same reporting subframe (especially for aperiodic CSI reporting).

For either of these two embodiments, upon receiving the K consecutive CSI reports, the eNB can process the incoming CSI reports to estimate the CSI associated with the larger port array. The above two embodiments can be summarized in TABLE 5.

TABLE 5

Signaling support to enable CSI-RS subsampling with K > 1 CSI-RS resources per CSI process

| Signaling embodiment | Parameter(s) to be signaled to UE | | |
|---|---|---|---|
| | Embodiment 1A | Embodiment 1B | Embodiment 2 |
| Higher-layer (RRC) signaling | Flag to enable K consecutive CSI reports, can also (optionally) include a sequence of CSI-RS resource indices | n/a | Flag to enable K consecutive CSI reports |
| L1 signaling | n/a | Via DL L1 control channel: Trigger in UL grant, can contain one CSI-RS resource index or a plurality of CSI-RS resource indices | Via UL control channel: CRI included in each CSI report or a subset of all CSI reports |

For the above embodiments, for the k-th configured CSI-RS resource (k=1, 2, . . . , K), a UE reports a CSI associated with $N_k$-port. The content of the CSI report associated with the k-th configured CSI-RS resource can include the relevant CSI parameters or only a subset of the relevant CSI parameters. In addition, the content of CSI report associated with the k-th CSI-RS resource can be different from the content of CSI report associated with the k'-th CSI-RS resource (k' k). Examples of the content of a CSI report is CQI+RI+$i_1$ (which can include $i_{1,1}$ and $i_{1,2}$)+$i_2$, RI+$i_1$ (which can include $i_{1,1}$ and $i_{1,2}$), $i_1$ only (which can include $i_{1,1}$ and $i_{1,2}$), RI+$i_{1,1}$, $i_{1,1}$ only, RI+$i_{1,2}$, $i_{1,2}$ only, RI+$i_2$, $i_2$ only, CQI+RI (for CSI reporting without PMI), CQI+$i_1$ (which can include $i_{1,1}$ and $i_{1,2}$)+$i_2$ (when RI reporting is not configured such as for MTC), or CQI only (when RI and PMI reporting are not configured).

In an example embodiment along the line of FIG. 7C and partial CSI reporting described in the previous paragraph, assuming an example setup of $N_1$=4, $N_2$=8, the UE can be configured to report $i_{1,1}$ without CQI associated with the first CSI-RS resource (with $N_1$=4) and assuming a 32-port dual-stage codebook (with PMI values of $i_1$ including $i_{1,1}$ and $i_{1,2}$, and $i_2$). In addition, the UE can be configured to report $i_{1,2}$ without CQI associated with the second CSI-RS resource (with $N_2$=8) and assuming the same 32-port dual-stage codebook (with PMI values of $i_1$ including $i_{1,1}$ and $i_{1,2}$, and $i_2$). Either one of the two CSI reports or both CSI reports can be reported with or without RI. If only one of the two CSI reports (labelled as CSI report A) contains an RI, the other CSI report (termed CSI report B) associated with the other CSI-RS resource is calculated conditioned on the RI from CSI report A. If each of the two CSI reports contains an RI, the two values of RI can be determined independently or set the same (for example, by setting one of CSI-RS resources as a reference for RI reporting).

Alternatively, the CSI calculation associated with the first CSI-RS resource (with $N_1$=4) can assume a 4-port one-dimensional codebook. The choice of codebook can be either single-stage codebook designed for single-polarized array (hence associated with a single PMI) or dual-stage codebook designed for dual-polarized array (hence associated with two PMI values and only a first PMI value $i_1$ is reported). The CSI calculation associated with the second CSI-RS resource (with $N_2$=8) can assume an 8-port one-dimensional codebook. The choice of codebook can be a dual-stage codebook designed for dual-polarized array (hence associated with two PMI values and only a first PMI value $i_1$ is reported).

The above example embodiments (along the line of FIG. 7C and partial CSI reporting) can be used to facilitate the eNB to obtain precoding information for the purpose of UE-specific beamforming on CSI-RS. Any of these embodiments can be used in conjunction with CLASS B eMIMO-Type with one CSI-RS resource. In this case, one CSI process is configured with three NZP CSI-RS resources wherein two resources are utilized for the UE to report two partial CSI reports described above and one resource for CLASS B eMIMO-Type with one CSI-RS resource (where the UE reports CQI+PMI+RI).

To configure a UE with a plurality of (K>1) CSI-RS resources within one CSI process for CSI-RS subsampling, at least one of the following components in the current LTE specification (Rel.13) can be utilized. This is especially relevant for the first subsampling embodiment (termed the time-port scheme). But it can be readily extended to the other three subsampling embodiments for those skilled in the art.

First, the RRC parameter eMIMO-Type (REFS), which takes value from CSI-RS-ConfigEMIMO, is set to 'beamformed' in REFS which is equivalent to eMIMO-Type of 'CLASS B' in REF3. Alternatively, instead of utilizing 'beamformedTCLASS B' eMIMO-Type, a new eMIMO-Type can be defined for this purpose. For example, a new type called 'CLASS B-2' can be defined. Alternatively, this utilization can be considered as a variation of 'CLASS A' eMIMO-Type if one composite CSI is reported for the K configured CSI-RS resources. Second, CSI-RS-ConfigNZ-PIdListExt (a list of K−1 NZP CSI-RS resource indices) is to be configured in the field CSI-RS-ConfigBeamformed in addition to CSI-RS-ConfigNZPId in the CSI-Process configuration. This is to add (K−1) additional NZP CSI-RS resources to the default one within the CSI-Process configuration. Third, channel and interference measurement restrictions (MRs) are configured and turned ON. This is done to avoid a UE from performing time interpolation across different CSI-RS resources. Fourth, as previously mentioned pertaining to TABLE 5, several example signaling schemes which do not necessarily preclude each other are possible. A first signaling scheme is to define a new RRC parameter which is a flag to enable a UE to measure K consecutive CSI-RS resources (such as AlternativeBeamformedKnaEnabled E {TRUE, FALSE}). A second signaling scheme is to define a new RRC parameter which indicates a sequence of preconfigured CSI-RS resource indices (for the UE to measure and calculate CSI from). A third signaling scheme, which applies only to P-CSI reporting, is to use some of the reserved fields in cri-ConfigIndex of cri-ReportConfig in REFS which is equivalent to $I_{CRI}$ in REF3.

For example, the first and second schemes are pertinent to embodiment 1A of TABLE 3. The first and third schemes are pertinent to signaling embodiment 2 of TABLE 5.

In an example embodiment for the third scheme, TABLE 7.2.2-1D in REF3] can be extended as shown in TABLE 6A. The first seven values of $I_{CRI}$ are used when CRI is reported by a UE. This set of $I_{CRI}$ values is used both for Rel.13 'CLASS B'/'beamformed' eMIMO-Type with a plurality of CSI-RS resources (wherein the UE reports CRI together with CQI/PMI/RI when PMI is reported, or CQI/RI when PMI is not reported, or CQI for one-port CSI-RS assuming the recommended CSI-RS resource index from the CRI report) and embodiment 2 in TABLE 5. The last seven values of $I_{CRI}$ are used when CRI is preconfigured for and hence not reported by a UE (for example, used in combination with the above first or second scheme, or embodiments 1A and 1B in TABLE 5).

TABLE 6A

Extension to Table 7.2.2-1D of REF3: Mapping of $I_{CRI}$ to $M_{CRI}$ when RI reporting is configured

| $I_{CRI}$ | Value of $M_{CRI}$ | CRI mode |
|---|---|---|
| 0 | 1 | UE reports CRI |
| 1 | 2 | |
| 2 | 4 | |
| 3 | 8 | |
| 4 | 16 | |
| 5 | 32 | |
| 6 | 64 | |
| 7 | 128 | |
| 8 | 1 | CRI is preconfigured. UE does |
| 9 | 2 | not report CRI. UE reports CSI |
| 10 | 4 | for each of the configured |
| 11 | 8 | CSI-RS resources. |
| 12 | 16 | |
| 13 | 32 | |
| 14 | 64 | |
| 15 | 128 | |
| 16 < $I_{CRI}$ ≤ 1023 | | Reserved |

Another possible extension is shown in TABLE 6B where only one reserved value of $I_{CRI}$ is used to indicate that CRI is not reported and the UE reports CSI (including CQI/PMI/RI when PMI is reported, or CQI/RI when PMI is not reported) for each of the K configured NZP CSI-RS resources. For P-CSI, each of the K CSI reports is reported based on the same procedure as a CSI report associated with a single CSI-RS resource. The assumed CSI-RS resource index for each CSI reporting instance can be signaled to the UE (according to one of the embodiments in TABLE 3) or predetermined.

TABLE 6B

Extension to Table 7.2.2-1D of REF3: Mapping of $I_{CRI}$ to $M_{CRI}$ when RI reporting is configured

| $I_{CRI}$ | Value of $M_{CRI}$ | CRI mode |
|---|---|---|
| 0 | 1 | UE reports CRI |
| 1 | 2 | |
| 2 | 4 | |
| 3 | 8 | |
| 4 | 16 | |
| 5 | 32 | |
| 6 | 64 | |
| 7 | 128 | |
| 8 | UE does not report CRI. UE reports CSI for each of the configured CSI-RS resources (according to a given CRI sequence). | |
| 9 < $I_{CRI}$ ≤ 1023 | Reserved | |

For A-CSI reporting, the first and/or second scheme can be used. In this case, CRI is not reported by the UE especially if the eNB includes a CSI-RS resource index or a set of CSI-RS resource indices in the CSI request field in the associated UL grant. Upon receiving a CSI request containing a CRI or a set of K' (≤K) CRIs in an UL grant in subframe n, a UE reports CSI associated with the CSI-RS resource(s) indicated CRI or the indicated set of K' CRIs.

Alternatively, upon receiving a CSI request in an UL grant, a UE reports K CSI reports associated with K configured CSI-RS resources. In this case, a CSI request field does not contain any CSI-RS resource index.

With the above two alternatives for A-CSI reporting, when K' (≤K) CSI reports associated with K' (≤K) CSI-RS resources are reported together in one aperiodic CSI reporting instance, these CSIs can be concatenated in at least two example arrangements. A first arrangement concatenates each CSI parameter (CQI, PMI, RI, or CRI) across K' (≤K) CSI reporting units. For example: {$CQI_0$, $CQI_1$, . . . , $CQI_{K'-1}$}, {$PMI_0$, $PMI_1$, . . . , $PMI_{K'-1}$}, {$RI_0$, $RI_1$, . . . , $RI_{K'-1}$}. A second arrangement concatenates CSI reporting units K' (≤K), except for RI (since RI is encoded separately from CQI and PMI). For example: {$CQI_0$, $PMI_0$}, {$CQI_1$, $PMI_1$}, . . . , {$CQI_{K'-1}$, $PMI_{K'-1}$}, {$RI_0$, $RI_1$, . . . , $RI_{K'-1}$}.

Fifth, for each of the K CSI reports associated with one of the K NZP CSI-RS resources, a codebook selection parameter or a set of codebook parameters can be used to select a codebook which is assumed for CSI calculation. This assumes that there are at least two possible codebooks or codebook sets for a given number of CSI-RS ports. This codebook parameter or set of codebook parameters specific for each CSI-RS resource can be signaled semi-statically via higher-layer (RRC) signaling. Sixth, for each of the K CSI reports associated with one of the K NZP CSI-RS resources, a CSI content parameter can be used to indicate the content of the CSI when partial CSI reporting is supported. For example, a two-bit CSI content parameter can indicate whether full CSI (CQI+PMI+RI) or partial CSI A (for example, RI+$i_{1,1}$) or partial CSI B (for example, RI+$i_{1,2}$) is reported.

In addition to the two components, an alternative embodiment for CSI reporting is as follows. As aforementioned, to feedback CSI reports associated with K>1 CSI-RS resources within one CSI process, each of the K or K' (≤K) CSI reports can be performed consecutively (one-by-one). Alternatively, it is possible to feed back the K or at least a set of K' (≤K) CSI reports—either triggered by one CSI request for A-CSI reporting (in that case, allowing the use of A-CSI mode 1-0 or 1-1 for multiple CSI-RS resources), or reported together periodically using format 4 or 5 PUCCH.

Yet another alternative embodiment on CSI-RS subsampling using one NZP CSI-RS resource is as follows. Referring to subsampling embodiment 1 (the time-port scheme) illustrated in FIG. 7A, 7B, or 7C, an alternative embodiment configures a UE with only one (K=1) NZP CSI-RS resource per CSI process while the UE is configured with 'beamformed' of eMIMO-Type in REFS or 'CLASS B' of eMIMO-Type in REF3. Channel measurement restriction to be configured (turned ON) as well. In this case, the eNB can configure the UE to measure different sets of CSI-RS ports across different CSI-RS-carrying subframes associated with the single NZP CSI-RS resource configuration. This alternative embodiment is UE-transparent. For example, referring to the description in FIG. 7A, 7B, or 7C, the UE can measure each instance of CSI-RS and feedback CSI reports associated with it. The eNB, knowing with which subset of CSI-RS ports each CSI report is associated, processes the multiple 8-port CSI reporting instances to approximate a CSI associated with the 32-port array.

Figure 8:
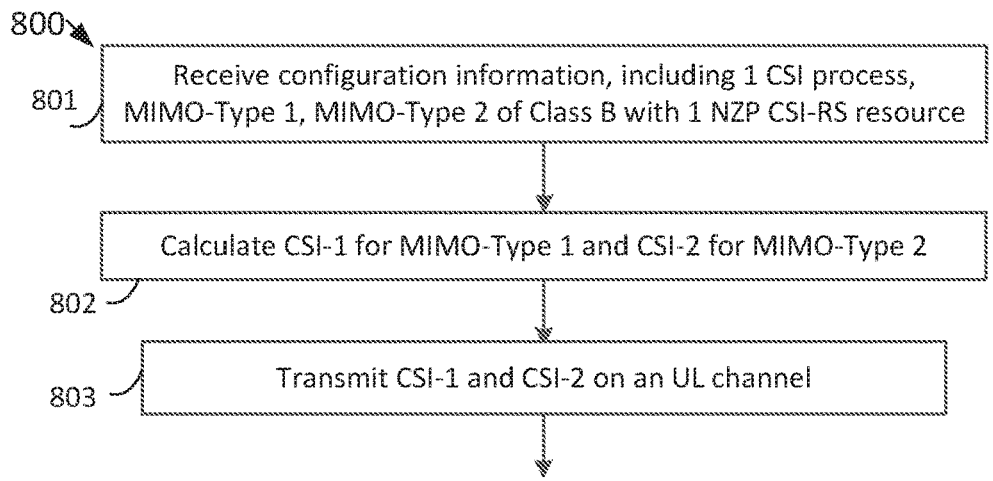
FIG. 8 illustrates a flowchart for an example method where a UE receives configuration information including a CSI process, a first MIMO Type, and a second MIMO Type according to an embodiment of the present disclosure.

FIG. 8 illustrates a flowchart for an example method 800 where a UE receives configuration information including one CSI process, a first MIMO Type, and a second MIMO Type according to an embodiment of the present disclosure. For example, the method 800 can be performed by the UE 116.

The method 800 begins with the UE receiving configuration information including one CSI process, a first MIMO Type, and a second MIMO Type (step 801) wherein the second MIMO Type is Class B and is associated with a single non-zero-power CSI Reference Signal (NZP CSI-RS) resource 2 of at most 8 ports (including 2, 4, or 8 antenna ports). At least two options are possible. In a first option, the first MIMO Type is Class A and is associated with a single non-zero-power (NZP) CSI-RS resource 1 of at least 8 antenna ports (including 8, 12, 16, 20, 24, 28, or 32 ports). In a second option, the first MIMO Type is Class B and is associated with multiple NZP CSI-RS resources, each resource comprising of at most 8 antenna ports (including 2, 4, or 8 ports).

In response to receipt of the configuration information, the UE calculates and reports a Channel State Information (CSI) for each of the two MIMO Types (step 802). Denoting these two CSIs as CSI-1 and CSI-2, respectively, in the first option, the CSI associated with the first MIMO Type (CSI-1), calculated in reference to the NZP CSI-RS resource 1, includes a first Precoding Matrix Indicator (PMI) $i_1$ from a codebook with at least two PMIs ($i_1$, $i_2$), and a Rank Indicator (RI). The RI associated with the first MIMO Type is either 1 or 3. In the second option, the CSI associated with the first MIMO Type (CSI-1) includes only a CSI-RS_Resource Indicator (CRI). The CSI associated with the second MIMO Type (CSI-2), calculated in reference to the NZP CSI-RS resource 2, includes Channel Quality Indicator (CQI), PMI, and RI. The UE transmits CSI-1 and CSI-2 on an UL channel (step 803).

Figure 9:
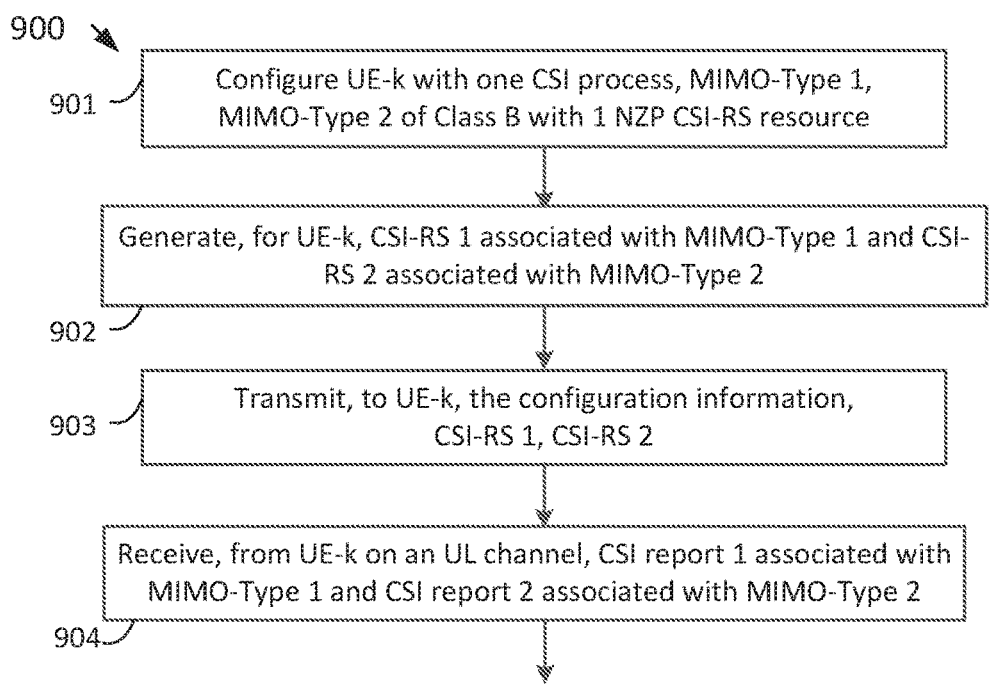
FIG. 9 illustrates a flowchart for an example method where a BS configures a UE (labeled as UE-k) with a CSI process, a first MIMO Type, and a second MIMO Type according to an embodiment of the present disclosure.

FIG. 9 illustrates a flowchart for an example method 900 where a BS configures a UE (labeled as UE-k) with one CSI process, a first MIMO Type, and a second MIMO Type according to an embodiment of the present disclosure. For example, the method 900 can be performed by the eNB 102.

The method 900 begins with the BS configuring UE-k with one CSI process, a first MIMO Type, and a second MIMO Type (step 901) wherein the second MIMO Type is Class B and is associated with a single non-zero-power CSI Reference Signal (NZP CSI-RS) resource 2 of at most 8 ports (including 2, 4, or 8 antenna ports). At least two options are possible. In a first option, the first MIMO Type is Class A and is associated with a single non-zero-power (NZP) CSI-RS resource 1 of at least 8 antenna ports (including 8, 12, 16, 20, 24, 28, or 32 ports). In a second option, the first MIMO Type is Class B and is associated with multiple NZP CSI-RS resources, each resource comprising of at most 8 antenna ports (including 2, 4, or 8 ports). The BS also generates, for UE-k, two CSI-RSs: CSI-RS 1 associated with the first MIMO Type and CSI-RS 2 associated with the second MIMO Type (step 902). The BS transmits, to UE-k, the configuration information and the two CSI-RS s associated with the two MIMO Types (step 903).

The BS also receives a Channel State Information (CSI), from UE-k on an UL channel, for each of the two MIMO Types (step 904). Denoting these two CSIs as CSI-1 and CSI-2, respectively, in the first option, the CSI associated with the first MIMO Type (CSI-1), calculated in reference to the NZP CSI-RS resource 1, includes a first Precoding Matrix Indicator (PMI) $i_1$ from a codebook with at least two PMIs ($i_1$, $i_2$), and a Rank Indicator (RI). The RI associated with the first MIMO Type is either 1 or 3. In the second option, the CSI associated with the first MIMO Type (CSI-1) includes only a CSI-RS_Resource Indicator (CRI). The CSI associated with the second MIMO Type (CSI-2), calculated in reference to the NZP CSI-RS resource 2, includes Channel Quality Indicator (CQI), PMI, and RI.

Although FIGS. 8 and 9 illustrate examples of methods for receiving configuration information and configuring a UE, respectively, various changes could be made to FIGS. 8 and 9. For example, while shown as a series of steps, various steps in each figure could overlap, occur in parallel, occur in a different order, occur multiple times, or not be performed in one or more embodiments.

Although the present disclosure has been described with example embodiments based on CSI process, any other entity which includes at least one CSI reporting and at least one RS for CSI measurement can be used. For instance, CSI process can be replaced with a link between a setting/configuration for CSI reporting and a setting/configuration for RS (or resource associated with or including RS) used for CSI measurement. This link can be included in a setting for CSI measurement. In this case, hybrid CSI schemes in the present disclosure can use either one link (for schemes using one CSI process with two eMIMO-Types) or two links (for schemes using two CSI processes with two eMIMO-Types).

Although the present disclosure has been described with example embodiments, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive configuration information including a channel state information (CSI) process, a first multiple-input multiple-output (MIMO) Type, and a second MIMO Type; and
a processor operably connected to the transceiver, the processor configured to calculate and report, in response to receipt of the configuration information, a CSI for each of the first and second MIMO Types; and
wherein the second MIMO Type is Class B, corresponds to a beamformed CSI-RS, and is associated with a single CSI reference signal (CSI-RS) resource that includes at most 8 antenna ports,
wherein the first MIMO Type is Class A, corresponds to a non-precoded CSI-RS, and is associated with a single CSI-RS resource that includes at least 8 antenna ports,
wherein the CSI for the first MIMO Type includes a first precoding matrix indicator (PMI) $i_1$ from a codebook including at least two PMIs ($i_1$, $i_2$) and a rank indicator (RI), and
wherein the RI is either 1 or 3.

2. The UE of claim 1, wherein the CSI for the first MIMO Type is calculated in reference to the CSI-RS resource for the first MIMO Type ($i_1$, $i_2$).

3. The UE of claim 2, wherein the RI is associated with the first MIMO Type.

4. The UE of claim 2, wherein the CSI for the second MIMO Type is calculated in reference to the CSI-RS resource for the second MIMO Type and includes a channel quality indicator (CQI), a PMI, and a RI.

5. The UE of claim 2, wherein the CSI for the first MIMO Type and the CSI for the second MIMO Type are calculated independently of each other.

6. The UE of claim 1, wherein the CSI for the first MIMO Type includes only a CSI-RS resource indicator (CRI).

7. A base station (BS) comprising:
a processor configured to:
generate, for a UE, configuration information including a channel state information (CSI) process, a first multiple-input multiple-output (MIMO) Type, and a second MIMO Type;
generate, for the UE, a CSI Reference Signal (CSI-RS) setting and a CSI-RS associated with the CSI-RS setting, the CSI-RS setting and associated CSI-RS corresponding to each of the first and second MIMO Types; and
a transceiver operably connected to the processor, the transceiver configured to:
transmit, to the UE, the configuration information and the CSI-RS corresponding to each of the first and second MIMO Types; and
receive, from the UE, a CSI report corresponding to each of the first and second MIMO Types on an uplink channel;
wherein the second MIMO Type is Class B, corresponds to a beamformed CSI-RS, and is associated with a single CSI-RS resource that includes at most 8 antenna ports, and
wherein the first MIMO Type is Class A, corresponds to a non-precoded CSI-RS, and is associated with a single CSI-RS resource which includes at least 8 antenna ports,
wherein the CSI for the first MIMO Type includes a first precoding matrix indicator (PMI) $i_1$ from a codebook including at least two PMIs ($i_1$, $i_2$) and a rank indicator (RI), and
wherein the RI is either 1 or 3.

8. The BS of claim 7, wherein:
the CSI report includes a CSI for each of the first and second MIMO Types, and
the CSI for the first MIMO Type is calculated in reference to the CSI-RS resource for the first MIMO Type $i_1$ ($i_1$, $i_2$).

9. The BS of claim 8, wherein the CSI for the second MIMO Type is calculated in reference to the CSI-RS resource for the second MIMO Type and includes a channel quality indicator (CQI), a PMI, and a RI.

10. The BS of claim 9, wherein the CSI for the first MIMO Type and the CSI for the second MIMO Type are calculated independently of each other.

11. The BS of claim 10, wherein the CSI for the first MIMO Type includes only a CSI-RS resource indicator (CRI).

12. A method for operating a user equipment (UE), the method comprising:
receiving, by the UE, configuration information including a channel state information (CSI) process, a first multiple-input multiple-output (MIMO) Type, and a second MIMO Type; and
in response to receipt of the configuration information, calculating and reporting, by the UE, a CSI for each of the first and second MIMO Types;
wherein the second MIMO Type is Class B, corresponds to a beamformed CSI-RS, and is associated with a single CSI reference signal (CSI-RS) resource which includes at most 8 antenna ports,
wherein the first MIMO Type is Class A, corresponds to a non-precoded CSI-RS, and is associated with a single CSI-RS resource which includes at least 8 antenna ports,
wherein the CSI for the first MIMO Type includes a first precoding matrix indicator (PMI) $i_1$ from a codebook including at least two PMIs ($i_1$, $i_2$) and a rank indicator (RI), and
wherein the RI is either 1 or 3.

13. The method of claim 12, wherein the CSI for the first MIMO Type is calculated in reference to the CSI-RS resource for the first MIMO Type $i_1$ ($i_1$, $i_2$).

14. The method of claim 13, wherein the RI is either 1 or 3.

15. The method of claim 13, wherein the CSI for the second MIMO Type is calculated in reference to the CSI-RS resource for the second MIMO Type and includes a channel quality indicator (CQI), a PMI, and a RI.

16. The method of claim 13, wherein the CSI for the first MIMO Type and the CSI for the second MIMO Type are calculated independently of each other.

17. The method of claim 12, wherein the CSI for the first MIMO Type includes only a CSI-RS Resource Indicator (CRI).

* * * * *